(12) United States Patent
Sinclair et al.

(10) Patent No.: US 8,141,147 B2
(45) Date of Patent: *Mar. 20, 2012

(54) SYSTEM, METHOD AND APPARATUS FOR USE IN MONITORING OR CONTROLLING INTERNET ACCESS

(75) Inventors: John W. Sinclair, Rhos-on-Sea (GB); Ian James Pettener, Lancashire (GB); Alistair H. Nash, Altrincham (GB)

(73) Assignee: Websense UK Limited, London (GB)

( * ) Notice: Subject to any disclaimer, the term of this patent is extended or adjusted under 35 U.S.C. 154(b) by 886 days.

This patent is subject to a terminal disclaimer.

(21) Appl. No.: 10/953,121

(22) Filed: Sep. 28, 2004

(65) Prior Publication Data

US 2006/0053488 A1   Mar. 9, 2006

(30) Foreign Application Priority Data

Sep. 9, 2004  (GB) .................................. 0420023.4

(51) Int. Cl.
*H04L 29/06* (2006.01)
(52) U.S. Cl. ................. 726/22; 726/11; 726/27
(58) Field of Classification Search ............... 726/4, 27, 726/28, 11; 713/176, 183
See application file for complete search history.

(56) References Cited

U.S. PATENT DOCUMENTS

| | | |
|---|---|---|
| 4,423,414 A | 12/1983 | Bryant et al. |
| 4,734,036 A | 3/1988 | Kasha |
| 4,941,084 A | 7/1990 | Terada et al. |
| 5,408,642 A | 4/1995 | Mann |
| 5,493,692 A | 2/1996 | Theimer et al. |
| 5,541,911 A | 7/1996 | Nilakantan et al. |
| 5,548,729 A | 8/1996 | Akiyoshi et al. |
| 5,555,376 A | 9/1996 | Theimer et al. |
| 5,581,703 A | 12/1996 | Baugher et al. |
| 5,586,121 A | 12/1996 | Moura et al. |
| 5,606,668 A | 2/1997 | Shwed |
| 5,648,965 A | 7/1997 | Thadani et al. |
| 5,678,041 A | 10/1997 | Baker et al. |
| 5,682,325 A | 10/1997 | Lightfoot et al. |
| 5,696,486 A | 12/1997 | Poliquin et al. |
| 5,696,898 A | 12/1997 | Baker et al. |
| 5,699,513 A | 12/1997 | Feigen et al. |
| 5,706,507 A * | 1/1998 | Schloss ........................ 707/104.1 |

(Continued)

FOREIGN PATENT DOCUMENTS

EP   0 658 837 A2   12/1994

(Continued)

OTHER PUBLICATIONS

Greenfield, P. et al. "Access Prevention techniques for Internet Content Filtering" CSIRO, Dec. 1999, XP002265027.

(Continued)

*Primary Examiner* — David Garcia Cervetti
(74) *Attorney, Agent, or Firm* — Knobbe Martens Olson & Bear LLP

(57) ABSTRACT

An apparatus, method and system for use in categorizing Uniform Resource Locators (URLs) when controlling or monitoring access to the Internet from a client. A request message is generated to request categorization of a specified URL. The request message comprises a licensing field carrying a license key. A remote server receives the license key and, if valid, generates a reply message denoting a category of the specified URL. The license key enables workload at the server to be managed efficiently.

30 Claims, 12 Drawing Sheets

U.S. PATENT DOCUMENTS

| | | | |
|---|---|---|---|
| 5,712,979 A | 1/1998 | Graber et al. | |
| 5,724,576 A | 3/1998 | Letourneau | |
| 5,758,257 A | 5/1998 | Herz et al. | |
| 5,768,519 A | 6/1998 | Swift et al. | |
| 5,774,668 A | 6/1998 | Choquier | |
| 5,781,801 A | 7/1998 | Flanagan et al. | |
| 5,787,253 A | 7/1998 | McCreery et al. | |
| 5,787,427 A | 7/1998 | Benantar et al. | |
| 5,796,944 A | 8/1998 | Hill et al. | |
| 5,799,002 A | 8/1998 | Krishnan | |
| 5,801,747 A | 9/1998 | Bedard | |
| 5,826,014 A | 10/1998 | Coley et al. | |
| 5,828,833 A | 10/1998 | Belville et al. | 395/187.01 |
| 5,828,835 A | 10/1998 | Isfeld et al. | |
| 5,832,212 A | 11/1998 | Cragun et al. | |
| 5,832,228 A | 11/1998 | Holden et al. | |
| 5,832,503 A | 11/1998 | Malik et al. | |
| 5,835,722 A | 11/1998 | Bradshaw et al. | |
| 5,835,726 A | 11/1998 | Shwed et al. | |
| 5,842,040 A | 11/1998 | Hughes et al. | |
| 5,848,233 A | 12/1998 | Radia et al. | |
| 5,848,412 A | 12/1998 | Rowland et al. | |
| 5,850,523 A | 12/1998 | Gretta, Jr. | |
| 5,855,020 A | 12/1998 | Kirsch | |
| 5,864,683 A | 1/1999 | Boebert et al. | |
| 5,884,033 A | 3/1999 | Duvall et al. | |
| 5,884,325 A | 3/1999 | Bauer et al. | |
| 5,889,958 A | 3/1999 | Willens | |
| 5,892,905 A | 4/1999 | Brandt et al. | |
| 5,893,086 A | 4/1999 | Schmuck et al. | |
| 5,896,502 A | 4/1999 | Shieh et al. | |
| 5,899,995 A | 5/1999 | Millier et al. | |
| 5,911,043 A | 6/1999 | Duffy et al. | |
| 5,933,827 A | 8/1999 | Cole et al. | |
| 5,937,404 A | 8/1999 | Csaszar et al. | |
| 5,941,947 A | 8/1999 | Brown et al. | |
| 5,944,794 A | 8/1999 | Okamoto et al. | |
| 5,950,195 A | 9/1999 | Stockwell et al. | |
| 5,956,734 A | 9/1999 | Schmuck et al. | |
| 5,958,015 A | 9/1999 | Dascalu | |
| 5,961,591 A | 10/1999 | Jones et al. | |
| 5,968,176 A | 10/1999 | Nessett et al. | |
| 5,978,807 A | 11/1999 | Mano et al. | |
| 5,983,270 A | 11/1999 | Abraham et al. | |
| 5,987,606 A | 11/1999 | Cirasole et al. | |
| 5,987,611 A | 11/1999 | Freund | |
| 5,991,807 A | 11/1999 | Schmidt et al. | |
| 5,996,011 A | 11/1999 | Humes | |
| 5,999,929 A | 12/1999 | Goodman | |
| 6,052,723 A | 4/2000 | Ginn | |
| 6,052,730 A | 4/2000 | Felciano et al. | |
| 6,055,564 A | 4/2000 | Phaal | |
| 6,065,056 A | 5/2000 | Bradshaw et al. | |
| 6,065,059 A | 5/2000 | Shieh et al. | |
| 6,070,242 A | 5/2000 | Wong et al. | |
| 6,073,239 A | 6/2000 | Dotan | |
| 6,078,913 A | 6/2000 | Aoki et al. | |
| 6,085,241 A | 7/2000 | Otis | |
| 6,092,194 A | 7/2000 | Touboul | |
| 6,105,027 A | 8/2000 | Schneider et al. | |
| 6,154,741 A | 11/2000 | Feldman | |
| 6,173,364 B1 | 1/2001 | Zenchelsky et al. | |
| 6,178,419 B1 | 1/2001 | Legh-Smith et al. | |
| 6,178,505 B1 | 1/2001 | Schneider et al. | |
| 6,182,118 B1 | 1/2001 | Finney et al. | |
| 6,219,667 B1 | 4/2001 | Lu et al. | |
| 6,219,786 B1 | 4/2001 | Cunningham et al. | 713/152 |
| 6,233,618 B1 * | 5/2001 | Shannon | 709/229 |
| 6,233,686 B1 | 5/2001 | Zenchelsky et al. | |
| 6,253,188 B1 | 6/2001 | Witek et al. | |
| 6,266,664 B1 | 7/2001 | Russell-Falla et al. | |
| 6,295,559 B1 | 9/2001 | Emens et al. | |
| 6,301,658 B1 * | 10/2001 | Koehler | 713/155 |
| 6,338,088 B1 | 1/2002 | Waters et al. | |
| 6,357,010 B1 | 3/2002 | Viets et al. | |
| 6,377,577 B1 | 4/2002 | Bechtolsheim et al. | |
| 6,418,433 B1 | 7/2002 | Chakrabarti et al. | |
| 6,434,662 B1 | 8/2002 | Greene et al. | |
| 6,446,119 B1 | 9/2002 | Olah et al. | |
| 6,456,306 B1 | 9/2002 | Chin et al. | |
| 6,460,141 B1 | 10/2002 | Olden | |
| 6,466,940 B1 | 10/2002 | Mills | |
| 6,486,892 B1 | 11/2002 | Stern | |
| 6,505,201 B1 | 1/2003 | Haitsuka et al. | |
| 6,519,571 B1 | 2/2003 | Guheen et al. | |
| 6,564,327 B1 * | 5/2003 | Klensin et al. | 726/7 |
| 6,567,800 B1 | 5/2003 | Barrera et al. | |
| 6,571,249 B1 | 5/2003 | Garrecht et al. | |
| 6,606,659 B1 * | 8/2003 | Hegli et al. | 709/225 |
| 6,741,997 B1 | 5/2004 | Liu et al. | |
| 6,742,003 B2 | 5/2004 | Heckerman et al. | |
| 6,772,214 B1 | 8/2004 | McClain et al. | |
| 6,785,732 B1 | 8/2004 | Bates et al. | |
| 6,804,780 B1 | 10/2004 | Touboul | |
| 6,807,558 B1 * | 10/2004 | Hassett et al. | 709/203 |
| 6,832,230 B1 | 12/2004 | Zilliacus et al. | |
| 6,832,256 B1 | 12/2004 | Toga | |
| 6,839,680 B1 | 1/2005 | Liu et al. | |
| 6,894,991 B2 | 5/2005 | Ayyagari et al. | |
| 6,907,425 B1 | 6/2005 | Barrera et al. | |
| 6,947,935 B1 | 9/2005 | Horvitz et al. | |
| 6,947,985 B2 | 9/2005 | Hegli et al. | |
| 6,978,292 B1 | 12/2005 | Murakami et al. | |
| 6,981,281 B1 * | 12/2005 | LaMacchia et al. | 726/27 |
| 7,051,200 B1 * | 5/2006 | Manferdelli et al. | 713/153 |
| 7,058,822 B2 | 6/2006 | Edery et al. | |
| 7,089,246 B1 | 8/2006 | O'laughlen | |
| 7,093,293 B1 | 8/2006 | Smithson et al. | |
| 7,096,493 B1 | 8/2006 | Liu | |
| 7,100,199 B2 * | 8/2006 | Ginter et al. | 726/4 |
| 7,185,015 B2 | 2/2007 | Kester et al. | |
| 7,185,361 B1 | 2/2007 | Ashoff et al. | |
| 7,194,464 B2 * | 3/2007 | Kester et al. | 1/1 |
| 7,197,713 B2 | 3/2007 | Stern | |
| 7,209,893 B2 | 4/2007 | Nii | |
| 7,213,069 B2 * | 5/2007 | Anderson et al. | 709/225 |
| 7,313,823 B2 | 12/2007 | Gao | |
| 7,359,372 B2 | 4/2008 | Pelletier et al. | |
| 7,376,154 B2 | 5/2008 | Ilnicki et al. | |
| 7,487,540 B2 | 2/2009 | Shipp | |
| 7,587,488 B2 | 9/2009 | Ahlander et al. | |
| 7,590,716 B2 * | 9/2009 | Sinclair et al. | 709/223 |
| 7,603,685 B2 | 10/2009 | Knudson et al. | |
| 7,603,687 B2 | 10/2009 | Pietraszak et al. | |
| 7,690,013 B1 | 3/2010 | Eldering et al. | |
| 7,895,445 B1 | 2/2011 | Albanese et al. | |
| 2001/0032258 A1 | 10/2001 | Ishida et al. | |
| 2001/0039582 A1 | 11/2001 | McKinnon et al. | |
| 2001/0047343 A1 | 11/2001 | Dahan et al. | |
| 2002/0042821 A1 | 4/2002 | Muret et al. | |
| 2002/0049883 A1 | 4/2002 | Schneider et al. | |
| 2002/0062359 A1 | 5/2002 | Klopp et al. | |
| 2002/0073089 A1 | 6/2002 | Schwartz et al. | |
| 2002/0091947 A1 | 7/2002 | Nakamura | |
| 2002/0103848 A1 | 8/2002 | Giacomini et al. | |
| 2002/0110084 A1 | 8/2002 | Butt et al. | |
| 2002/0120754 A1 | 8/2002 | Anderson et al. | 709/229 |
| 2002/0129039 A1 | 9/2002 | Majewski et al. | |
| 2002/0129140 A1 | 9/2002 | Peled et al. | |
| 2002/0129277 A1 | 9/2002 | Caccavale | |
| 2002/0133509 A1 | 9/2002 | Johnston et al. | |
| 2002/0144129 A1 | 10/2002 | Malivanchuk et al. | |
| 2002/0152284 A1 | 10/2002 | Cambray et al. | |
| 2002/0174358 A1 | 11/2002 | Wolff et al. | |
| 2002/0178374 A1 | 11/2002 | Swimmer et al. | |
| 2003/0005112 A1 | 1/2003 | Krautkremer | |
| 2003/0009495 A1 | 1/2003 | Adjaoute | |
| 2003/0018491 A1 * | 1/2003 | Nakahara et al. | 705/1 |
| 2003/0023860 A1 | 1/2003 | Eatough et al. | |
| 2003/0074567 A1 | 4/2003 | Charbonneau | |
| 2003/0093694 A1 | 5/2003 | Medvinsky et al. | |
| 2003/0097617 A1 * | 5/2003 | Goeller et al. | 714/39 |
| 2003/0105863 A1 | 6/2003 | Hegli et al. | |
| 2003/0110168 A1 | 6/2003 | Kester et al. | |
| 2003/0110272 A1 | 6/2003 | Du Castel et al. | |
| 2003/0120543 A1 | 6/2003 | Carey | |
| 2003/0126136 A1 | 7/2003 | Omoigui | |

| | | | |
|---|---|---|---|
| 2003/0126139 A1 | 7/2003 | Lee et al. | |
| 2003/0135611 A1 | 7/2003 | Kemp et al. ............... 709/224 | |
| 2003/0167257 A1 | 9/2003 | De Bonet | |
| 2003/0177187 A1 | 9/2003 | Levine et al. | |
| 2003/0177394 A1 | 9/2003 | Dozortsev | |
| 2003/0182420 A1* | 9/2003 | Jones et al. ............... 709/224 | |
| 2003/0185395 A1* | 10/2003 | Lee et al. ............... 380/277 | |
| 2003/0185399 A1* | 10/2003 | Ishiguro ............... 380/281 | |
| 2004/0003139 A1* | 1/2004 | Cottrille et al. ............... 709/331 | |
| 2004/0006621 A1* | 1/2004 | Bellinson et al. ............... 709/225 | |
| 2004/0015586 A1 | 1/2004 | Hegli et al. | |
| 2004/0019656 A1 | 1/2004 | Smith | |
| 2004/0034794 A1 | 2/2004 | Mayer et al. | |
| 2004/0049514 A1 | 3/2004 | Burkov | |
| 2004/0062106 A1 | 4/2004 | Ramesh et al. | |
| 2004/0068479 A1 | 4/2004 | Wolfson et al. | |
| 2004/0078591 A1 | 4/2004 | Teixeira et al. | |
| 2004/0105416 A1* | 6/2004 | Rue ............... 370/338 | |
| 2004/0111499 A1 | 6/2004 | Dobrowski et al. | |
| 2004/0123157 A1 | 6/2004 | Alagna et al. | |
| 2004/0128285 A1 | 7/2004 | Green et al. | |
| 2004/0148524 A1 | 7/2004 | Airamo | |
| 2004/0153644 A1 | 8/2004 | McCorkendale | |
| 2004/0167931 A1 | 8/2004 | Han | |
| 2004/0172389 A1 | 9/2004 | Galai et al. | |
| 2004/0181788 A1 | 9/2004 | Kester et al. | |
| 2004/0220924 A1 | 11/2004 | Wootton | |
| 2005/0015626 A1 | 1/2005 | Chasin | |
| 2005/0033967 A1* | 2/2005 | Morino et al. ............... 713/182 | |
| 2005/0066197 A1 | 3/2005 | Hirata et al. | |
| 2005/0091535 A1 | 4/2005 | Kavalam et al. | |
| 2005/0131868 A1 | 6/2005 | Lin et al. | |
| 2005/0132042 A1* | 6/2005 | Cryer ............... 709/224 | |
| 2005/0132184 A1 | 6/2005 | Palliyil et al. | |
| 2005/0138353 A1 | 6/2005 | Spies | |
| 2005/0155012 A1 | 7/2005 | Tayama et al. | |
| 2005/0210035 A1 | 9/2005 | Kester et al. | |
| 2005/0223001 A1 | 10/2005 | Kester et al. | |
| 2005/0251862 A1 | 11/2005 | Talvitie | |
| 2006/0004636 A1 | 1/2006 | Kester et al. | |
| 2006/0004717 A1 | 1/2006 | Ramarathnam et al. | |
| 2006/0026105 A1* | 2/2006 | Endoh ............... 705/59 | |
| 2006/0031213 A1 | 2/2006 | Wilson et al. | |
| 2006/0031504 A1 | 2/2006 | Hegli et al. | |
| 2006/0053488 A1 | 3/2006 | Sinclair et al. | |
| 2006/0064469 A1 | 3/2006 | Balasubrahmaniyan et al. | |
| 2006/0068755 A1 | 3/2006 | Shraim et al. | |
| 2006/0075072 A1 | 4/2006 | Sinclair et al. | |
| 2006/0075494 A1 | 4/2006 | Bertman et al. | |
| 2006/0095404 A1 | 5/2006 | Adelman et al. | |
| 2006/0095459 A1 | 5/2006 | Adelman et al. | |
| 2006/0095586 A1 | 5/2006 | Adelman et al. | |
| 2006/0095965 A1 | 5/2006 | Phillips et al. | |
| 2006/0101514 A1 | 5/2006 | Milener et al. | |
| 2006/0129644 A1 | 6/2006 | Owen et al. | |
| 2006/0168006 A1 | 7/2006 | Shannon et al. | |
| 2006/0265750 A1 | 11/2006 | Huddleston | |
| 2007/0005762 A1 | 1/2007 | Knox et al. | |
| 2007/0011739 A1 | 1/2007 | Zamir et al. | |
| 2007/0028302 A1 | 2/2007 | Brennan et al. | |
| 2007/0156833 A1 | 7/2007 | Nikolov et al. | |
| 2008/0267144 A1 | 10/2008 | Jano et al. | |
| 2008/0295177 A1 | 11/2008 | Dettinger et al. | |
| 2009/0070872 A1 | 3/2009 | Cowings et al. | |
| 2010/0005165 A1* | 1/2010 | Sinclair et al. ............... 709/223 | |

FOREIGN PATENT DOCUMENTS

| | | |
|---|---|---|
| EP | 0 748 095 | 12/1996 |
| EP | 0 986 229 | 3/2000 |
| EP | 1 074 916 | 2/2001 |
| EP | 1 180 889 | 2/2002 |
| EP | 1 180 889 A2 | 2/2002 |
| EP | 1 278 136 | 1/2003 |
| EP | 1 278 330 | 1/2003 |
| EP | 1 280 040 | 1/2003 |
| EP | 1 318 468 | 6/2003 |
| EP | 1 329 117 | 7/2003 |
| EP | 1 318 468 | 11/2003 |
| EP | 1 457 885 | 9/2004 |
| EP | 1 494 409 | 1/2005 |
| EP | 1 510 945 | 3/2005 |
| FR | 2 811 494 | 1/2002 |
| GB | 2418330 | 3/2006 |
| GB | 2418999 | 4/2006 |
| JP | 10 243018 | 9/1998 |
| JP | 11-219363 | 8/1999 |
| JP | 2000-235540 | 8/2000 |
| JP | 2000 235540 A | 8/2000 |
| JP | 2002-358253 | 12/2002 |
| JP | 2003-050758 | 2/2003 |
| JP | 2004-013258 | 1/2004 |
| WO | WO 92/19054 | 10/1992 |
| WO | WO 96/05549 A1 | 2/1996 |
| WO | WO 96/42041 | 12/1996 |
| WO | WO 98/28690 | 7/1998 |
| WO | WO 01/24012 | 4/2001 |
| WO | WO 01/31512 | 5/2001 |
| WO | WO 01/33371 | 5/2001 |
| WO | WO 01/55873 | 8/2001 |
| WO | WO 01/55905 A1 | 8/2001 |
| WO | WO 01/63835 | 8/2001 |
| WO | WO 2005/010692 | 2/2005 |
| WO | WO 2005/017708 | 2/2005 |
| WO | WO 2005/074213 | 8/2005 |
| WO | WO 2006/027590 | 3/2006 |
| WO | WO 2006/136605 | 12/2006 |

OTHER PUBLICATIONS

International Search Report and Written Opinion dated Dec. 8, 2005 for International App. No. PCT/GB2005/Y6424 filed on Sep. 9, 2005.

Goldman, R. et al. "DataGuides: Enabling Query Formulation and Optimization in Semistructured Databases" Proceedings of the International Conference on Very Large Data Bases, Aug. 26, 1997 pp. 436-445.

International Search Report and Written Opinion dated dated Dec. 9, 2005 for International Application No. PCT/GB2005/003482 filed on Sep. 9, 2005.

Surfcontrol "Project Nomad" Oct. 29, 2003; See: http://www.surfcontrol.com/news/newsitem.aspx?id=593.

United Kingdom Search Report dated Oct. 7, 2004 for application GB0417620.2 and Combined Search and Examination Report dated Oct. 8, 2004.

United Kingdom Search Report dated Nov. 4, 2004 for corresponding UK application GB0420024.2.

United Kingdom Search Report dated Jan. 6, 2005 for corresponding UK application GB0420025.9.

United Kingdom Search Report dated Jan. 31, 2005 for corresponding UK application GB0420023.4.

PCT International Search Report and Written Opinion dated Oct. 19, 2005 for corresponding Int'l application PCT/GB2005/002961.

C. L. Schuba and E. H. Spafford, Countering abuse of name-based authentication, Pub: In 22nd Annual Telecommunications Policy Research Conference, 1996, pp. 21.

Cohen, F., A Cryptographic Checksum for Integrity Protection, Computers & Security, Elsevier Science Publishers, Dec. 1, 1987, vol. 6, Issue 6, pp. 505-510, Amsterdam, NL.

European Search Report for Application No. 02258462.7, Jan. 30, 2006.

Forte, M. et al., "A content classification and filtering server for the Internet", Applied Computing 2006. 21st Annual ACM Symposium on Applied Computing, [online] http://portal.acm.org/citation.cfm?id=1141553&coll=portal&dl=ACM&CFID=2181828&CFTOKEN=68827537> [retrieved on Dec. 7, 2007], Apr. 23, 2006-Apr. 27, 2006, pp. 1166-1171.

Gittler F., et al., The DCE Security Service, Pub: Hewlett-Packard Journal, Dec. 1995, pp. 41-48.

IBM Technical Disclosure Bulletin, Mean to Protect System from Virus, IBM Corp., Aug. 1, 1994, Issue 659-660.

Igakura, Tomohiro et al., Specific quality measurement and control of the service-oriented networking application., Technical Report of IEICE, IEICE Association, Jan. 18, 2002, vol. 101, Issue 563, pp. 51-56, Japan.

International Search Report and Written Opinion dated Jun. 30, 2008 for PCT Patent Application No. PCT/US2007/024557.

International Search Report and Written Opinion for PCT Application No. PCT/US2007/015730 dated Dec. 27, 2008, 16 pages.

International Search Report, International Application No. PCT/US2006/049149, Mailed Mar. 10, 2008, 4 pages.

Microsoft Press Computer Dictionary, 3rd edition, Pub: Microsoft Press, 1997, pp. 262, 276.

Molitor, Andrew, An Architecture for Advanced Packet Filtering, Proceedings for the Fifth Usenix Unix Security Symposium, Jun. 1995, pp. 1-11.

Newman, H., A Look at Some Popular Filtering Systems, Pub: Internet, Online!, Jul. 25, 1999, pp. 1-11.

PCT International Search Report and Written Opinion for International Application No. PCT/US2008/052483., Feb. 11, 2009.

Roberts-Witt, S., The 1999 Utility Guide: Corporate Filtering, Pub: PC Magazine Online, Apr. 5, 1999, pp. 1-11.

Sandhu, et al., Access Control: Principles and Practice, IEEE Communications Magazine, Sep. 1994, pp. 40-48.

Secure Computing Corporation, SmartFilter™ Web Tool, Dec. 1, 1998, pp. 1-2.

Sequel Technology, Inc., Sequel and Surfwatch Partner to Provide Innovative Internet Resource Management Tools for Large Enterprises, Pub: Internet, Online!, Feb. 25, 1999, pp. 1-3.

Snyder, J., A Flurry of Firewalls, www.opus1.com/www/jms/nw-firewall.html, Network World, Jan. 29, 1996, pp. 1-8.

Supplementary European Search Report for EPO App. No. 00 90 7078, May 18, 2004.

SurfControl PLC, SuperScout Web Filter Reviewer's Guide, 2002, pp. 36.

SurfWatch Software, SurfWatch® Professional Edition: Product Overview, Pub: Internet, Online!, May 26, 1999, pp. 1.

Symantec Corporation, E-security begins with sound security policies, Announcement Symantec, XP002265695, Jun. 14, 2001, pp. 1,9.

Williams, R., Data Integrity with Veracity, Retrieved from the Internet: <URL: ftp://ftp.rocksoft.com/clients/rocksoft/papers/vercty10.ps>, Sep. 12, 1994.

Wobus, J., DHCP FAQ, www.nd.edu/~milind/FAQs/FAQ_dhcp, Dec. 29, 1995, pp. 1-10.

Yialelis, et al., Role-Based Security for Distributed Object Systems, Proceedings of the IEEE Fifty Workshops on Enabling Technology: Infrastructure for Collaborative Enterprises, WET ICE '96, Jun. 19, 1996-Jun. 21, 1996, pp. 6.

Greenfield, P., et al., Access Prevention Techniques for Internet Content Filtering, CSIRO (XP002265027), Dec. 1999.

Surfcontrol, Project Nomad, http:www.surfcontrol.com/news/newsitem.aspx?id=593, Oct. 29, 2003.

Deal et al., Prescription for data security, NIKKEI BITE, NIKKEI BP Inc., Oct. 1, 1991, vol. 91, pp. 351-369, Japan.

Ohuchi, Access control for protecting an important data from destruction and manipulation, NIKKEI Computer, NIKKEI MAGUROUHIRU Inc., Feb. 3, 1986, vol. 141, pp. 75-80, Japan.

Parental Control White Paper, Internet Citation, Aug. 2001; Retrieved from: http://www.planetweb.com/products/web/pcwhitepaper.html [retrieved on Mar. 18, 2004].

Resnick, P. et al., "PICS: Internet Access Controls Without Censorship", Communications of the Association for Comuting Machinery, ACM, Oct. 1, 1996, vol. 39, Issue 10, pp. 87-93, New York, NY.

Takizawa, Utility of a filtering tool 'Gate Guard' of Internet, Nikkei Communication, Nikkei BP Inc., Oct. 20, 1997, vol. 256, pp. 136-139, Japan.

* cited by examiner

SYSTEM, METHOD AND APPARATUS FOR USE IN MONITORING OR CONTROLLING INTERNET ACCESS

CROSS-REFERENCE TO RELATED APPLICATIONS

This application claims priority, under 35 USC §119, from United Kingdom Patent Application No. GB04 20023.4 filed on Sep. 9, 2004, which is incorporated by reference herein in its entirety.

BACKGROUND

1. Field of the Development

The present invention relates in general to a system, method and apparatus for use in monitoring or controlling Internet access. In particular, the present invention relates to a system, method and apparatus for categorising Uniform Resource Locators (URLs) during Internet access.

2. Description of the Related Art

The Internet is a global interconnection of computers and computer networks. One of the great benefits of the Internet is that many millions of users have access to shared information of the World Wide Web, whereby pages of text and graphic information in HTML or other formats are transmitted by a Hyper Text Transfer Protocol (HTTP). Each web page has a unique address, known as a Uniform Resource Locator (URL). The Internet and its supporting structures are discussed in detail in Requests for Comments (RFCs). Reference is made in particular to RFC760 (Internet Protocol) and RFC1738 (Uniform Resource Locators).

Although the Internet provides access to a vast amount of information, it is widely recognised that open access at all times to all forms of information is not appropriate. For example, many schools and businesses provide Internet access for their students and employees. However, the school or business is, at least in part, responsible for dissemination of information within that organisation and is usually under an obligation to prevent circulation of racist, sexist or other abusive materials. This is just one example situation where there is a strong need for a measure of control over Internet access. Other examples include public spaces such as libraries or Internet cafes or public Internet kiosks. Another example is a home environment, where parents may wish to prevent their children accessing adult oriented web pages.

Prior art systems are available to address this need for monitoring or controlling access to the Internet. One example system is discussed at U.S. Pat. No. 5,996,011, which describes making a linguistic analysis of a web page on the fly before delivering the web page or selected portions thereof to a user. Other approaches include comparing a requested URL against a previously-determined list of forbidden URLs, known as a "deny list". However, both of these approaches require relatively large resources, i.e. a computing platform with a relatively fast processor, a large memory, and plenty of storage space such as a hard disk. The World Wide Web currently contains over 200 million websites, with tens of thousands of new sites being added each week. Each site usually contains many individual web pages. As a result, any form of filtering using "deny lists" requires relatively large storage space. Even an on the fly approach as in U.S. Pat. No. 5,996,011 using linguistic analysis requires a relatively large space to store objectionable words or phrases, and requires intensive processor usage in order to maintain reasonable response times.

A further problem arises in that many computer users are not technically literate. Most computer users are not computer experts and would like to be able to use their computer with a minimum of fuss or problems. Hence, it is desired to provide an apparatus, method and system for monitoring or controlling Internet access which is simple, reliable and user friendly.

A Local Area Network (LAN) is often used to connect together computers located in one building or site. In this LAN environment access to the Internet is provided though a Proxy Server, which receives and services URL requests from within the LAN by communicating with the Internet. Some of the client computers in this LAN environment may have relatively limited resources, such as a dumb terminal or diskless workstation. Another example is a Personal Digital Assistant or other handheld computing device. In one preferred aspect of the present invention it is desired to provide an apparatus, method and system for monitoring or controlling internet access which is ideally simple, fast and reliable, in this LAN environment.

Many users, particularly in a small office or home office environment (SOHO) environment, connect to the Internet through an Internet Service Provider (ISP). Typically, the connection is established through dedicated hardware of an Internet gateway appliance such as a modem or a router. However, there is a strong price pressure on Internet gateway appliances and a strong desire to minimise equipment specification. This means minimising processor requirements, memory requirements, and storage requirements, all of which are directly contrary to known approaches for monitoring or controlling Internet access. In a preferred aspect of the present invention it is desired to provide an apparatus, method and system for monitoring or controlling internet access which is ideally simple, fast and reliable, when using an Internet gateway appliance.

Another emerging need relates to Internet appliances which are created to perform a specific dedicated function whilst also being connected to the Internet. One example is a web TV for displaying audiovisual signals. Such Internet appliances are generally intended for use by consumers who have little or no technical knowledge, by providing a simple and easy to use set of controls as opposed to the fully controllable interface of a regular computer. Again, most Internet appliances are designed to minimise processor, memory and storage requirements. In a preferred aspect of the present invention it is desired to provide an apparatus, method and system for monitoring or controlling internet access which is simple, fast and reliable, when using an Internet appliance.

An aim of the present invention is to address the disadvantages and problems of the prior art, as discussed above or elsewhere.

SUMMARY OF THE DEVELOPMENT

According to the present invention there is provided an apparatus, method and system as set forth in the appended claims. Preferred features of the invention will be apparent from the dependent claims, and the description which follows.

According to the present invention there is provided a method for use in controlling or monitoring of Internet access by categorising Uniform Resource Locators (URLs), comprising the steps of: generating a request message to request categorisation of a specified URL, wherein the request message comprises a licensing field carrying a licence key; and validating the license key and, if valid, generating a reply message denoting a category of the specified URL amongst a predetermined set of categories.

Also according to the present invention there is provided a method for use at a categorisation server to assist in controlling or monitoring of Internet access at a client device by categorising Uniform Resource Locators (URLs), comprising the steps of: receiving a request message to request categorisation of a specified URL, wherein the request message comprises a licensing field carrying a licence key; and validating the license key and, if valid, generating a reply message denoting a category of the specified URL amongst a predetermined set of categories.

Further according to the present invention there is provided a system for use in controlling or monitoring of Internet access by categorising Uniform Resource Locators (URLs), comprising: a client device arranged to monitor or control Internet access according to a category code of a specified URL and arranged to generate a request message to request categorisation of the specified URL, wherein the request message includes a licensing field; and a categorisation server arranged to communicate with the client device and arranged to validate the license key and, if valid, generate a reply message denoting a category of the specified URL amongst a predetermined set of categories.

Also according to the present invention there is provided a categorisation server, comprising: a first module arranged to receive a request message denoting a specified URL and to provide a corresponding category code in return, wherein the request message further comprises a licence key; and a licence module arranged to validate the licence key and thereby control whether or not the first module provides the category code.

In another aspect of the present invention there is provided a licensing cache structure for use in controlling or monitoring of Internet access by categorising Uniform Resource Locators (URLs), comprising: a hash array comprising one or more index elements, each index element comprising a licence tree pointer and a hash key derived from a stored licence code; and one or more licence trees comprising one or more tree nodes each holding licence data representing stored licence codes and an associated validity status.

The present invention may, in some embodiments, be implemented as computer software. The invention also extends to a program storage medium having computer executable instructions stored thereon to perform any of the methods described herein.

For a better understanding of the invention, and to show how embodiments of the same may be carried into effect, reference will now be made, by way of example, to the accompanying diagrammatic drawings in which:

DETAILED DESCRIPTION OF THE DEVELOPMENT

Figure 1:
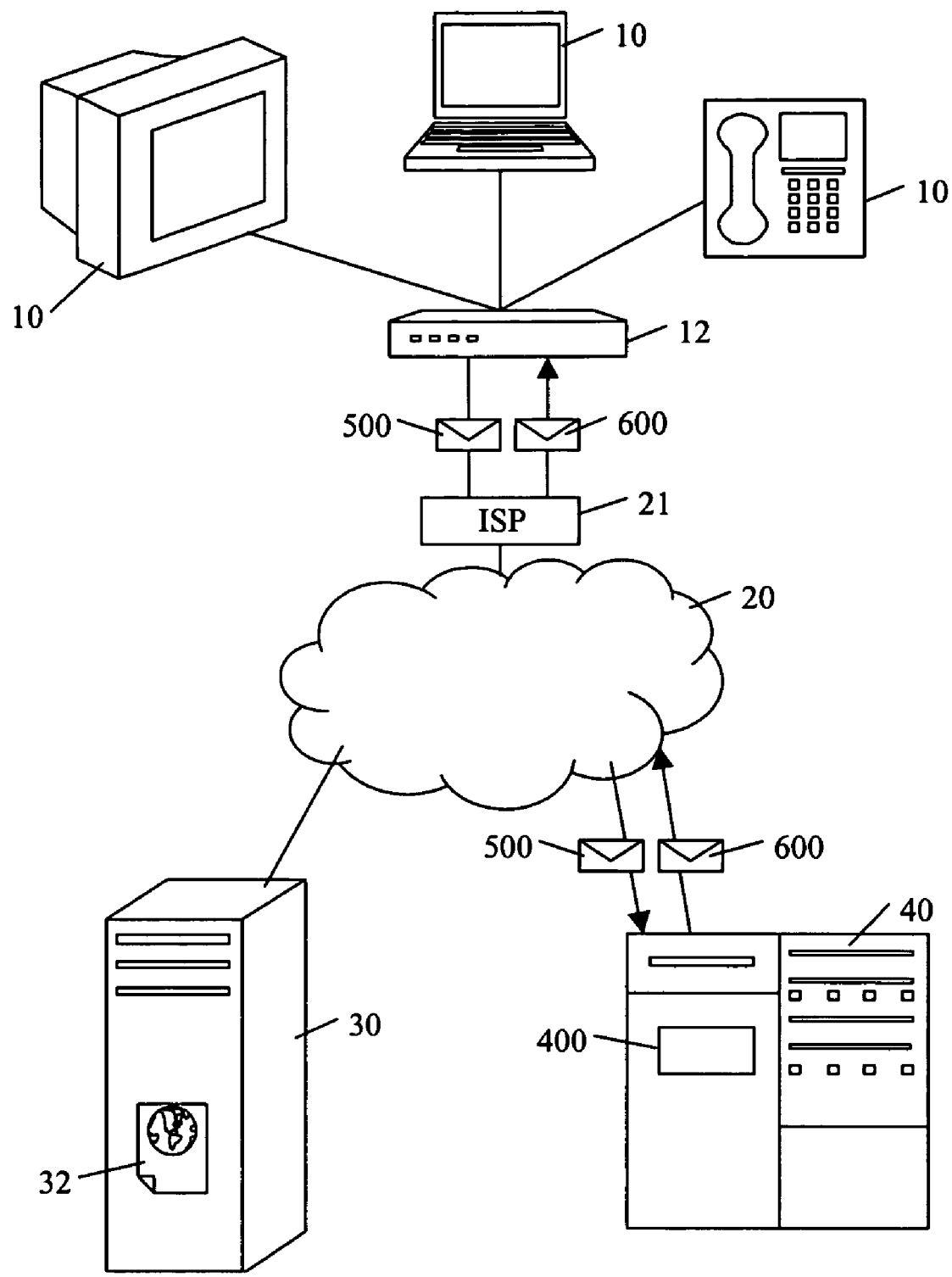
FIG. 1 is a schematic overview of a system and apparatus as employed in first preferred embodiments of the present invention.

Referring to FIG. 1, a schematic overview is shown of a system and apparatus as employed in preferred embodiments of the present invention. In this first example embodiment, a user machine 10 is connected to the Internet 20 through an Internet gateway appliance or client gateway 12.

The preferred embodiments of the present invention are primarily applicable to the World Wide Web, whereby a web page 32 is provided in response to a URL request sent under HTTP. In use, the user machine 10 provides a web browser application which initiates a URL request 11 in order to obtain content, i.e. a web page 32, from a content server or host 30. The web page 32 may take any suitable form, most commonly being text and graphics in HTML format. It will be appreciated however that the present invention is applicable to other forms of content provided over the Internet using URLs, such as file transfers under FTP or connection to a TELNET server.

It is desired to passively monitor and log the requested URLs for inspection later, or perform an active filtering function which determines whether the user machine 10 will receive or display the requested web page 32. To this end, it is useful to place URLs into categories. In a simple example, the categories are either "allow" or "deny". In a more sophisticated example, it is helpful to categorise URLs with greater granularity.

The preferred embodiments of the present invention place each requested URL into one of a predetermined set of categories. Specific downstream actions for controlling or monitoring Internet access, such as filtering or logging functions, are not particularly relevant to the present invention and may take any suitable form.

The preferred embodiment provides eight core categories such as "adult/sexual explicit", "criminal skills", "drugs, alcohol, tobacco", "violence" or "weapons", as well as thirty two productivity-related categories such as "advertisements", "games", "hobbies and recreation" or "kids sites". Providing this predetermined set of categories allows a more sophisticated rules-based filtering or logging function. For example, a rule is used to alert an administrator when a request is made for any of the core categories, or to block selected productivity categories at particular times and allowing access only say at lunchtimes or outside work hours. To cater for all eventualities, the preferred categories may also include "don't know" or "not found" options.

The user machine 10 provides input and output interface functions appropriate for a human user, suitably including a display screen, speakers, and control keys or GUI. As shown in FIG. 1, in one embodiment the user machine 10 is a computing platform such as a desktop computer, a laptop computer, or a personal digital assistant (PDA). In another embodiment, the user machine 10 is a function-specific Internet appliance, such as a web-TV. In a third example, the user machine 10 is a public Internet kiosk, in this case also shown as including a voice telephone.

In one embodiment, the user machine 10 and the client gateway 12 are formed as physically separate devices and communicate by any appropriate wired or wireless link. In other embodiments the client gateway 12 is integrated within the user machine 10.

As one preferred implementation which is useful particularly in a SOHO type environment, the client gateway 12 suitably includes a modem, such as an analogue, ISDN or ADSL modem, which connects to an Internet Service Provider (ISP) 21 over the plain old telephone system (POTS) or other wired or optical network to provide a network layer connection to the Internet 20. As another example, the client gateway 12 connects to the Internet 20 through a wireless network or cellular mobile network such as GSM or GPRS. In still other embodiments, the client gateway 12 connects to the Internet 20 through an intermediary such as a LAN or WAN, optionally over a virtual private network (VPN).

Referring to FIG. 1, in a preferred embodiment the client gateway 12 acts as a router and forwards data packets between computers or computer networks. In this illustrated example of FIG. 1, the client gateway 12 directs packets between the user machine 10 and the ISP 21. Routers typically use packet headers and forwarding tables to determine the best path for forwarding each data packet.

The client gateway 12 typically has relatively limited computing resources. In one example embodiment, the client gateway is a router having an Intel IXP422 processor, 64 MB RAM and 16 MB of Flash memory. There is no hard disk or other large-capacity storage device within the client gateway. The client gateway may also perform other functions, typically acting as a combined modem, router, firewall, local network switch or VPN client, or any combination thereof. Hence, there is strong competition for resources in order to accommodate some or all of these functions within a single low-cost device.

It is desired to offer logging or filtering functions at the client gateway 12, because this is a natural control point between the upstream network of the ISP 21, and the downstream network of the user machine 10. The monitoring or controlling function relies, as an initial step, on placing requested URLs into categories. However, as just discussed, a problem arises in that the client gateway 12 typically has only limited available processor, memory and storage resources. Hence, there is a strong need to minimise resources used within the client gateway 12 when providing an Internet access controlling or monitoring function.

Figure 2:
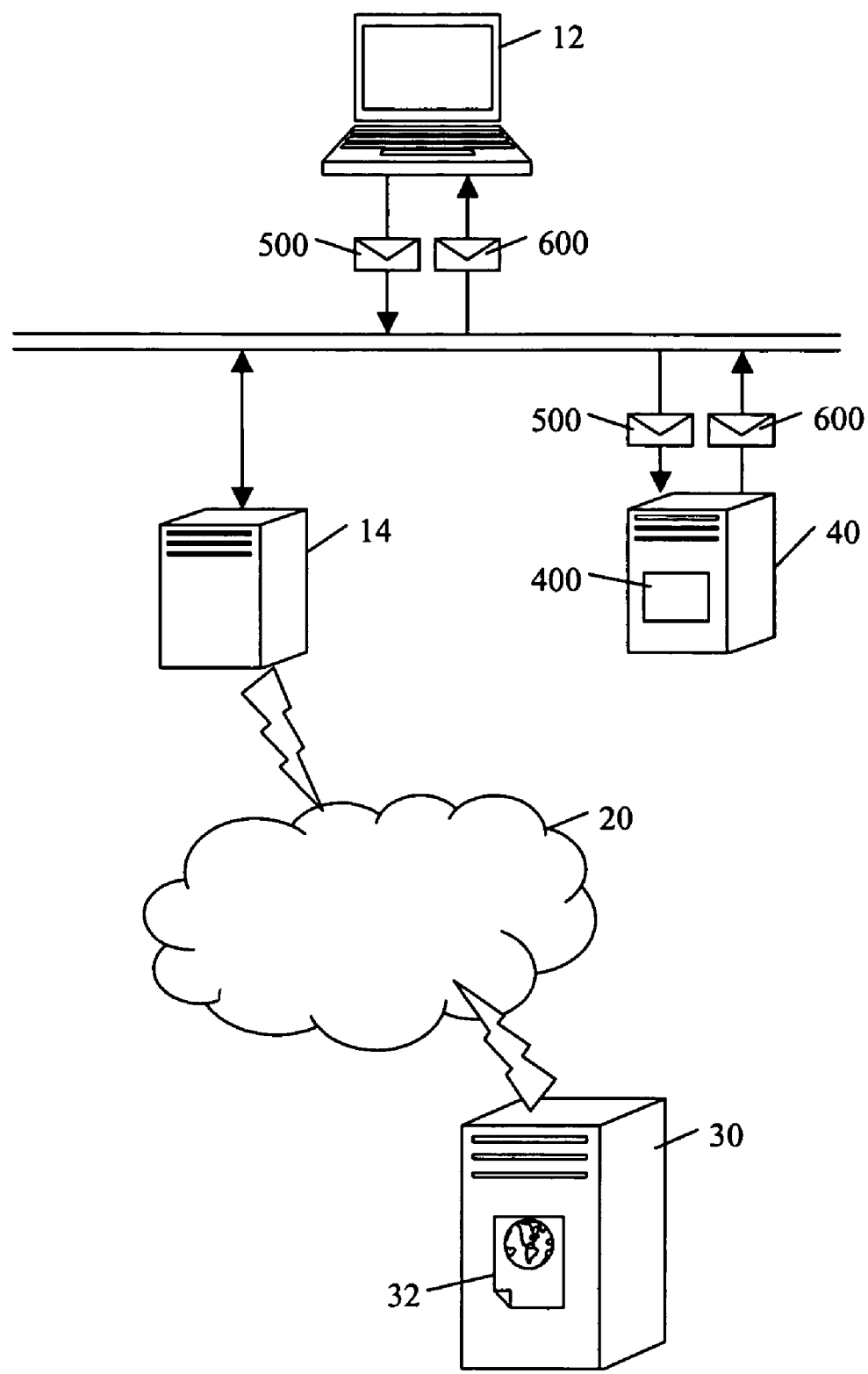
FIG. 2 is a schematic overview of a system and apparatus as employed in second preferred embodiments of the present invention.

FIG. 2 shows a second example system and apparatus as employed in an alternative embodiment of the present invention.

Referring to FIG. 2, a client computer 12 is part of a Local Area Network (LAN) which also includes a proxy server 14 coupled to the Internet 20. The client computer 12 makes URL requests in order to receive web pages from a content server 30 available over the Internet 20. The URL requests are processed through the proxy server 14. It is desired to monitor or control Internet access at the client computer 12. The present invention is particularly applicable where the client computer 12 has relatively limited processor, memory or storage resources, such as a terminal or a diskless workstation.

Referring now to both FIGS. 1 and 2, the client 12 (i.e. the client gateway 12 of FIG. 1 or the client computer 12 of FIG. 2) sends a request message 500 to a server computer 40 hosting a categorisation service 400. The request message 500 identifies a specified URL, such as extracted from a HTTP URL request. This categorisation server 40 identifies one of the predetermined set of categories appropriate to the specified URL, and sends a reply message 600 to the client 12. The reply message 600 identifies the appropriate category, which the client 12 then employs to perform the desired monitoring or controlling function.

This arrangement reduces resource requirements at the client 12, and allows the categorisation server 40 to run on a large and powerful computing system with plenty of processing power, memory and storage space. This categorisation service 400 may take any suitable form. For example, upon receiving the URL categorisation request 500, the categorisation service 400 looks up an appropriate category for the specified URL using a category database. Additionally or alternatively, the categorisation service employs a linguistic or other analysis of the specified URLs to determine an appropriate category, with or without human intervention and review.

A problem arises in that it is desired to reduce delays when requesting a web page 32, while a URL is placed into a predetermined category. Also, in practical embodiments of the present invention, many tens, hundreds or thousands of clients 12 are able to communicate with the categorisation server 40. It is desired to minimise communication traffic. Also, it is desired to minimise overheads both within the client 12, and within the central categorisation server 40.

Message Protocol

A first aspect of the present invention concerns an improved protocol for communication between first and second computing platforms, in this example between the client 12 and the categorisation server 40, when making requests to place URLs into categories.

Figure 3:
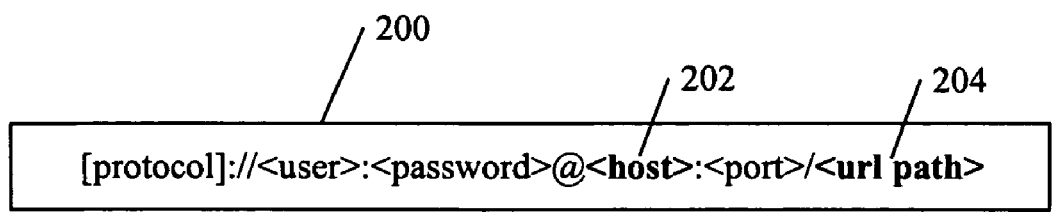
FIG. 3 shows an example of a uniform resource locator (URL)

FIG. 3 shows the standard format of a uniform resource locator (URL), as described in detail in RFC1738. The URL 200 includes a host portion 202 and a page portion 204. The host portion 202 identifies a particular host (e.g. "www.host.com"), whilst the page portion gives a path to a specific web page (e.g. "/directory/page.html"). A root page (i.e. "www.host.com/") at the host is conveniently shown by giving the host portion 202 as "www.host.com" and the page portion 204 as "/".

Figure 4:
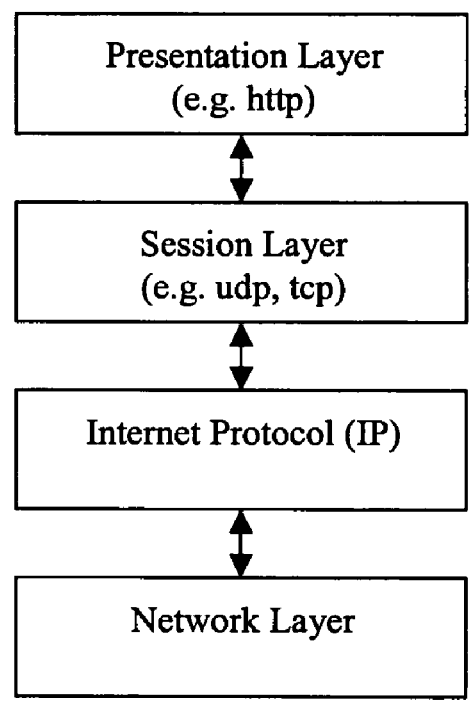
FIG. 4 shows part of a protocol stack appropriate for communication relating to the Internet.

FIG. 4 shows part of a standard protocol stack appropriate for communication relating to the Internet, as described in more detail in RFC760 and elsewhere. The Internet Protocol (IP) interfaces to a local network protocol, and to higher level protocols for communication between network nodes or hosts. The basic function of the Internet Protocol is to move datagrams from a source address to a destination address.

Various host to host protocols exist, including the hypertext transfer protocol (HTTP) which is used to carry URL requests and provide web pages 32 for the World Wide Web. However, HTTP has no mechanism to efficiently carry the request messages 500 and the reply messages 600 for categorisations of URLs as employed by the present invention.

Also, several messaging protocols have been defined. As examples, FIG. 4 shows a Transmission Control Protocol (TCP) as defined for example in RFC761 and a User Datagram Protocol (UDP) as defined for example in RFC768. TCP is ideal for applications which require reliable delivery of data in a specified order. TCP sets up a connection between hosts, which is maintained open for the duration of a session. Whilst reliable, TCP has a relatively large overhead. By contrast, UDP is a fast and lightweight protocol, but is relatively unreliable. In particular, delivery and duplication protection are not guaranteed. UDP is connectionless, with no handshaking or acknowledgements between hosts. Hence, neither of these messaging protocols is suited to carrying requests and replies concerning URL categorisation.

Figure 5:
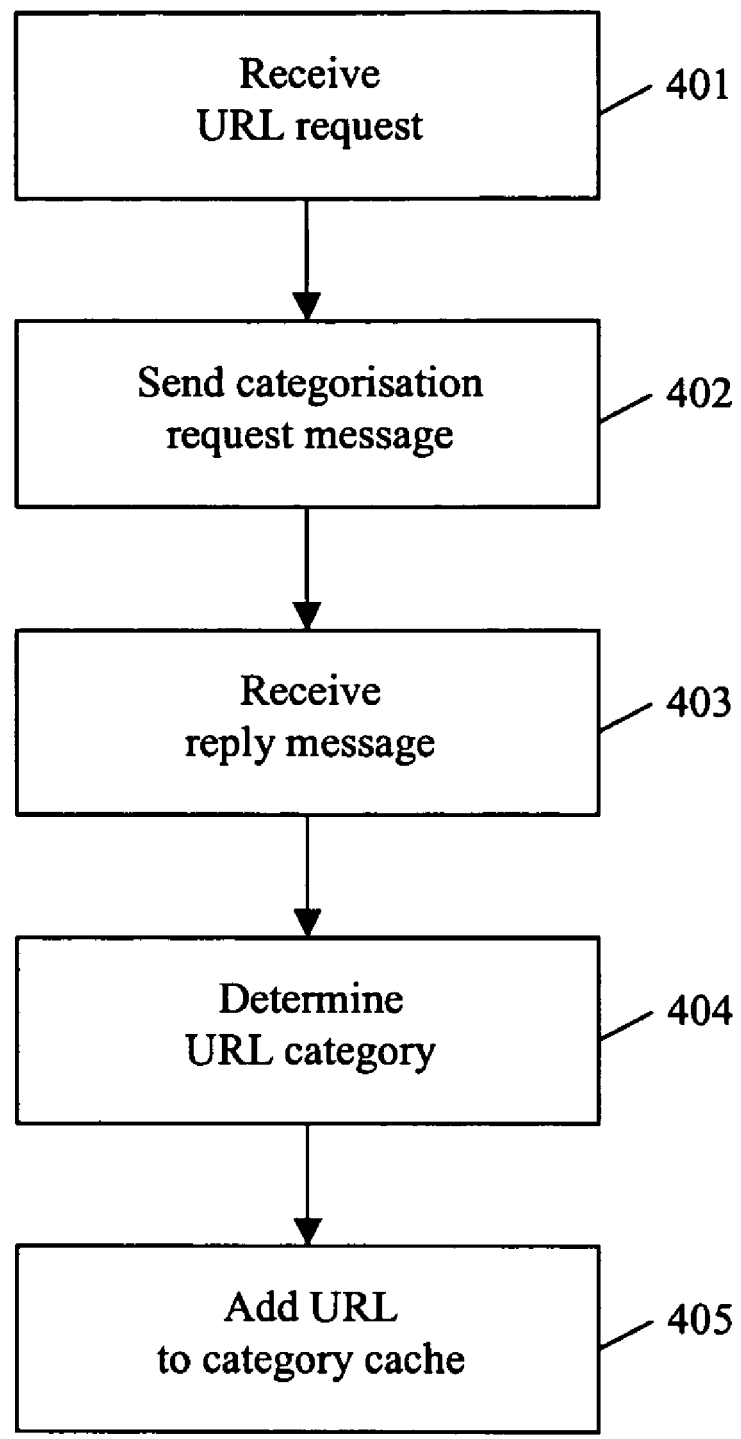
FIG. 5 is a schematic view of a preferred method for categorisation of URL requests.

FIG. 5 is a schematic view of a preferred method for categorisation of URL requests, according to an embodiment of the present invention. A URL request is received at step 401, and a request message 500 is sent at step 402. A reply message 600 is received at step 403, and a URL category is determined at step 404.

In the present invention, the request message 500 and the reply message 600 are each sent as the payload of a UDP packet. Surprisingly, it has been found that the unreliable and limited messaging capability of UDP can be employed to advantage in the context of categorisation of URLs. However, in order to use UDP, additional steps are taken by the present invention to adapt the protocol. More detailed explanation of the request message 500 and the reply message 600 now follows.

Figure 6:
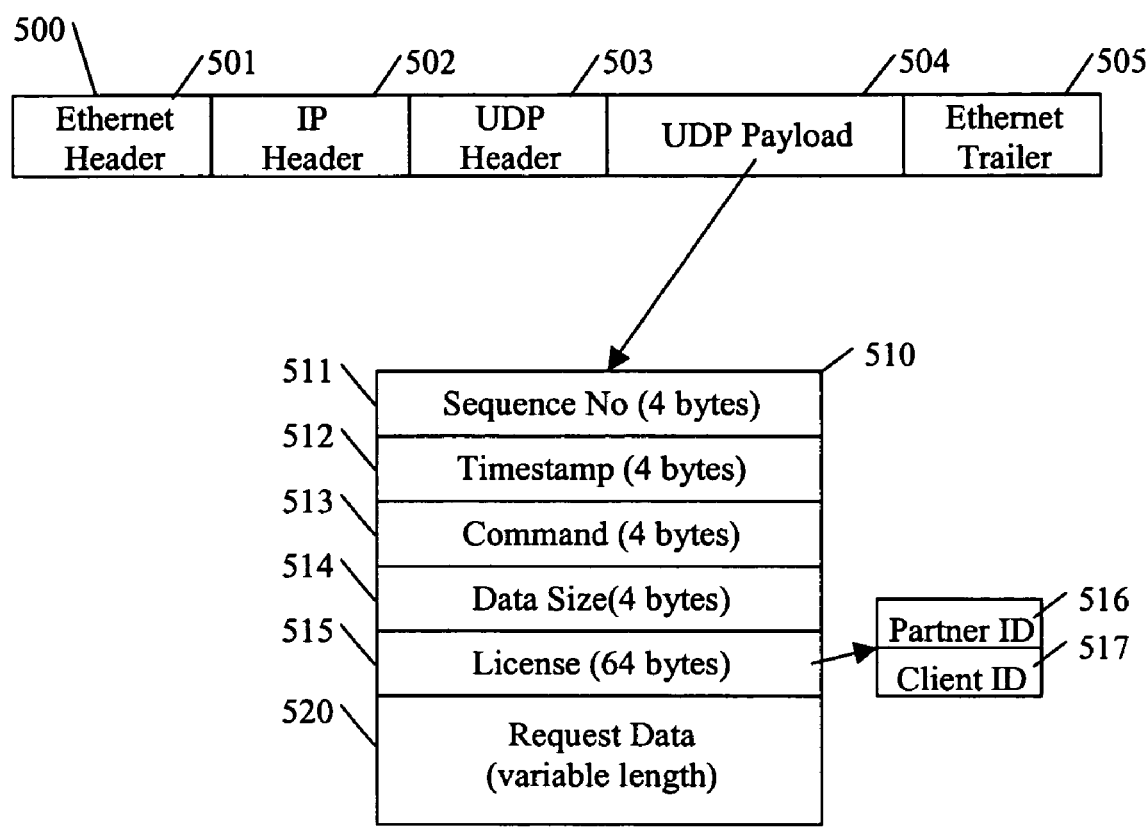
FIG. 6 shows a preferred format of a request message packet.

FIG. 6 shows a preferred format of the request message packet 500, which includes an Ethernet packet header 501, an IP header 502, a UDP header 503, a UDP payload 504, and an Ethernet trailer 505. These are all formatted according to existing protocols.

As shown in FIG. 6, the UDP payload 504 is divided to form a request message header section 510 and a request message data section 520.

The header section 510 comprises a sequence number 511 and a time stamp 512, and suitably a command identity 513, a data size 514, and a licensing field 515.

The sequence number 511 allows the request message 500 to be uniquely identified and distinguished from other request messages. The sequence number 511 is generated upon creation of the request message 500 within the client 12, suitably as an incremental value circling between 0 and 65535. Under UDP, each client-side socket exists only for the duration of a request-reply cycle and hence each request is assigned a different port value by the host process within, in this example, the client 12. However, there is a possibility that a reply could be passed back to a port of an incorrect waiting thread. The sequence number 511 allows a reply to be matched up with an originating request message 500.

The time stamp 512 enables calculation of timeouts. The client 12 originating the request message 500 waits a predetermined length of time for a reply message 600, and then re-tries for a predetermined number of times. Preferably, the timeout is increased after each resend, with an exponential back off (e.g. 2, 4 and then 8 seconds for a maximum retry count of 3).

The sequence number 511 and the time stamp 512 together provide excellent reliability, whilst adding only minimal overhead.

The command ID field 513 allows the request message to perform different command functions. In most cases, the command ID is set to "1" in order to request categorisation of a URL. Also, the request message uses a command ID of "2" to request that the categorisation server 40 provide a current list of categories, or a command ID of "3" to confirm a current list version and determine whether an update is required. Other commands can be defined as appropriate. Hence, the command ID field 513 brings increased flexibility and allows the system to perform additional functions.

The data section 520 contains data representing a specified URL 200. The URL data 520 includes a host portion 202 and, where appropriate, a URL path portion 204. The request data 520 is encrypted, preferably with a secret-key block encryption algorithm such as RC2 which is described in detail at RFC2268. Encryption of the data section 520 improves security and privacy. However, encrypting only the data section 520 minimises both encryption workload and transmission overhead. The size of the encrypted data section 520 is stored as the data size field 514 in the request header 510.

The licensing field 515 optionally transmits a licence identity relevant to the originator of the request message 500. The licence identity is suitably associated with the client 12 or optionally the user machine 10.

Figure 7:
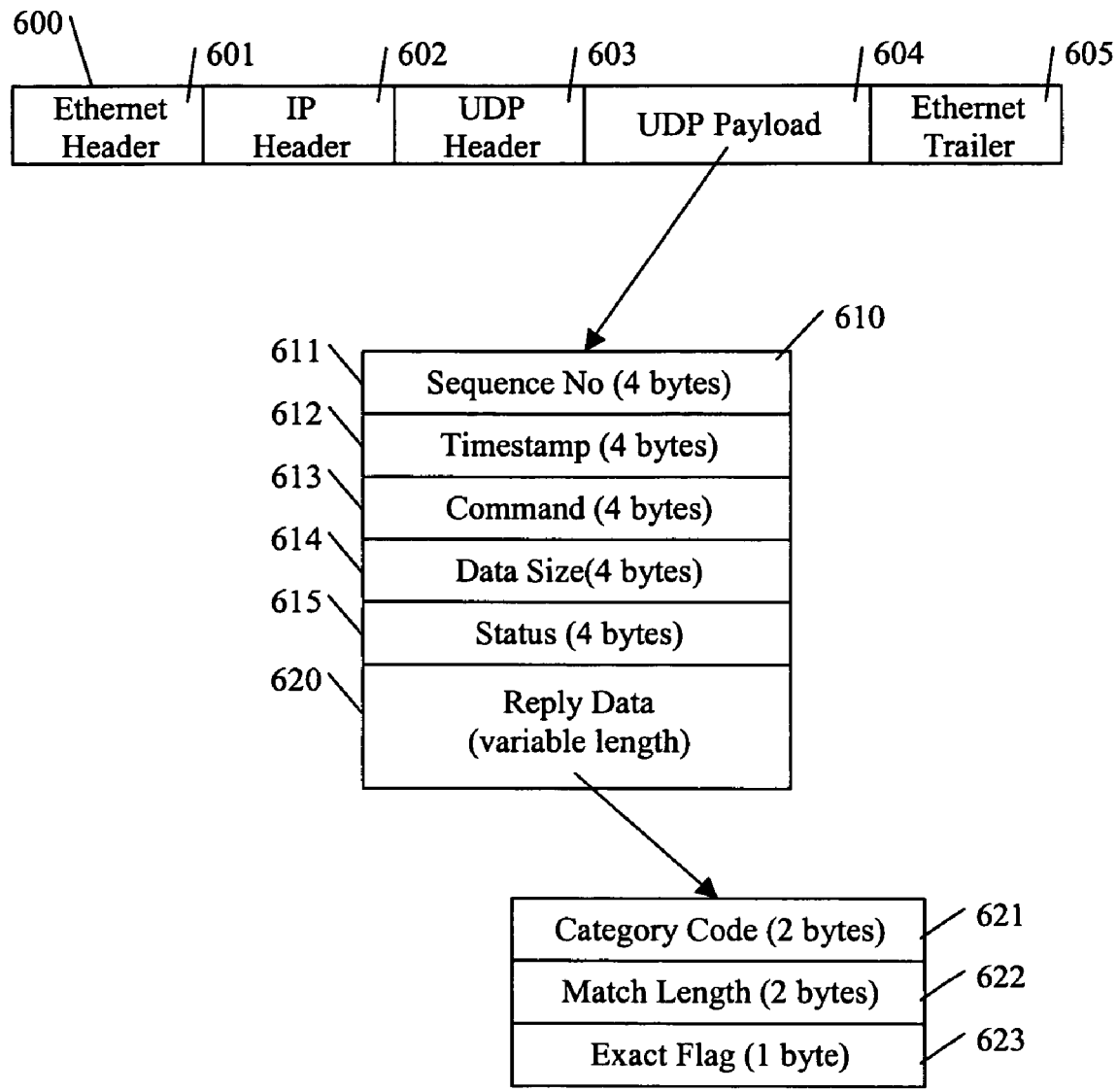
FIG. 7 shows a preferred format of a reply message packet.

FIG. 7 is a schematic representation of a reply message 600 as generated by the categorisation server 40 and sent to the client 12. The reply message 600 includes a UDP payload comprising a response header 610 and a response data section 620. The response header 610 comprises a sequence number 611 and a time stamp 612, preferably with a command ID 613, all copied from a corresponding received categorisation request message 500. A data size 614 gives a size of the following response data section 620. A status code 615 denotes a status. This is usually simply "success", but occasionally relates to one of a predetermined set of error statuses.

The response data 620 is formatted according to the relevant command ID 613 and is preferably encrypted, such as with RC2. In response to a request to categorise URL, the response data 620 comprises a category 621, a match length 622, and an exact flag 623. The category 621 identifies one amongst a predetermined set of categories for the URL sent in the request data 520, suitably as a numerical value (e.g. category "27" is say sports related web pages). The exact flag 623 determines whether the requested URL 520 was matched exactly. If only a partial match was obtained, such as a match with only the host portion 202 or only part of the URL path 204, then a match length is given in the match length field 622. The match length determines a number of characters of the specified URL 520 which were matched with a stored URL at the server 40. The character count is taken along the host portion 202 or the path portion 204, or both. In the preferred embodiment, the count is taken along the path portion 204 only. A match on the root page "/" counts as one character.

In response to other command types, the response data 620 contains other data such as a category list specifying a predetermined list of categories, or a version identity which identifies a current version of the category list being used by the categorisation server 40. These other command types can be used to trigger software or configuration updates at the client 12.

As shown in FIGS. 6 and 7, the request message 500 and reply message 600 each use the payload section of a UDP packet, which usually has a maximum size of 65 Kb as defined by the MTU (Maximum Transmission Unit) of the network. By contrast, the Ethernet physical layer packet has a maximum size of just 1500 bytes. Even so, in the present invention almost all of the request and reply messages 500, 600 for categorisation of URLs fit within the very limited size constraints of a single Ethernet packet, thus avoiding fragmentation.

Figure 8:
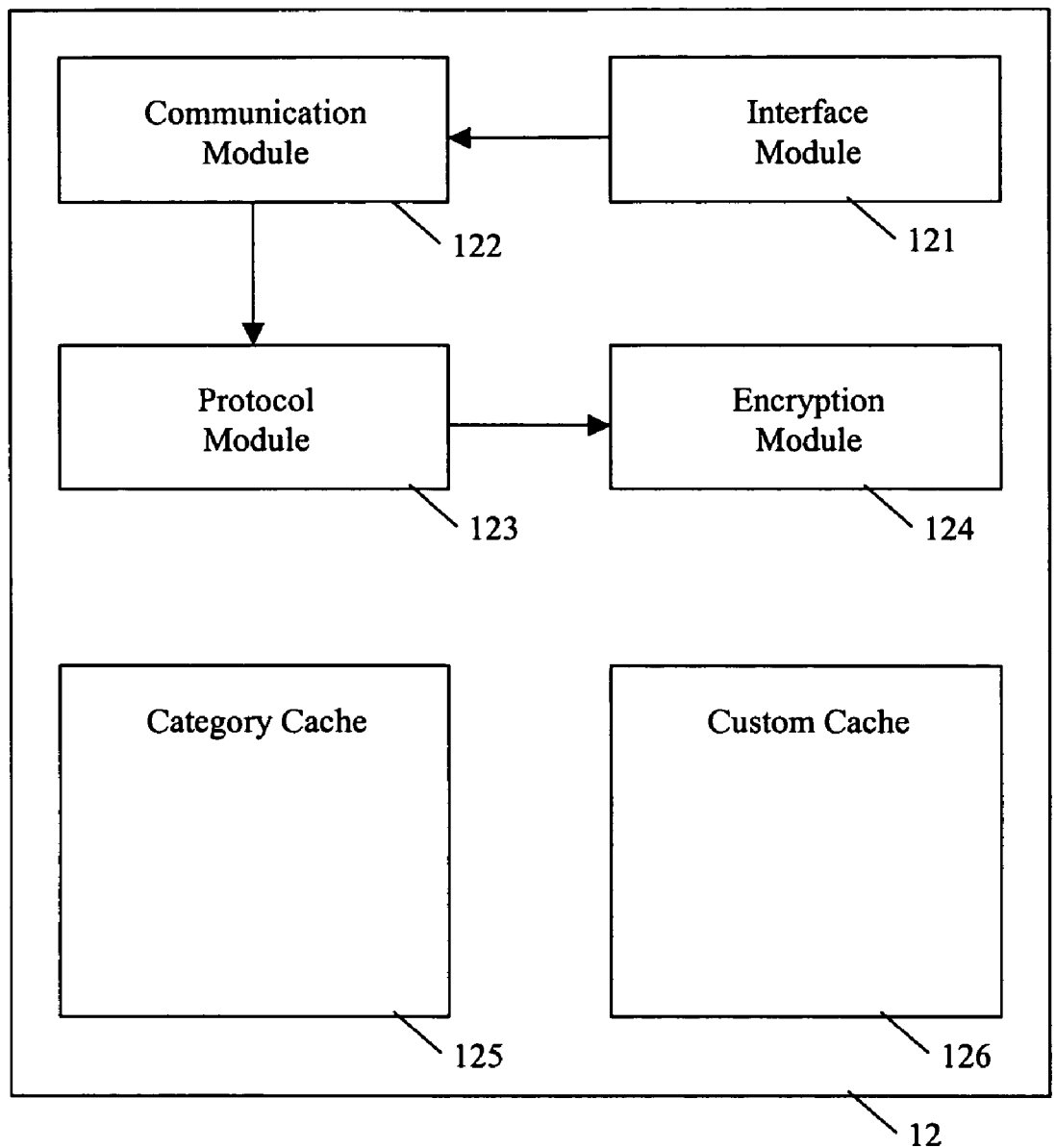
FIG. 8 is a schematic overview of an example client gateway apparatus.

FIG. 8 shows the client 12 in more detail, including an interface module 121, a communication module 122, a protocol module 123 and an encryption module 124. The interface module 121 presents the URL categorisation function to a client application, such as to a web browser or a HTTP function (not shown). The interface is suitably an API (application programming interface) to the client software. The interface module 121 is passed a URL from the client software, and returns a categorisation code 621, preferably with a match length 622 and an exact flag 623. The communication module 122 sends outgoing data to the categorisation server 40 and receives and buffers incoming data, including making retransmission requests as necessary. The protocol module 123 interprets the incoming and outgoing data according to the protocol discussed above with reference to FIGS. 5, 6 & 7 and makes encryption/decryption calls to the encryption module 124. The encryption module 124 encrypts and decrypts data.

In the preferred embodiment, the communication module 122 calculates a retransmission timeout for every sent request. To be effective, it is desired that the timeout interval take account of vastly varying network conditions, and adapt accordingly. This helps to eliminate both unnecessary retransmissions and unrealistically high timeout periods. Optionally, the number of retries is configurable such as through a user interface.

The preferred method for calculating the re-transmission timeout "rto" includes (a) measuring the round-trip time "mt" for each request, (b) maintaining a estimate of the smoothed round-trip time "srtt", and (c) maintaining an estimate of the smoothed mean deviation "smd". The estimates are calculated as:

$$srtt' = srtt + (abs(mt - srtt)/8)$$

$$smd' = smd + ((abs(mt - srtt) - smd)/4)$$

From these estimates, the timeout value is calculated as:

$$rto = srtt + 4(smd)$$

Advantageously, this formula is quickly calculated using fixed-point arithmetic and bit shifts.

If any time-out period rto expires, then next timeout is exponentially increased by:

$$rto' = rto * 2$$

The preferred embodiment of the present invention has many advantages, including in particular minimising overhead when requesting categorisation of URL requests and minimising workload at the gateway appliance 12. The preferred embodiment employs UDP for speed and simplicity, whilst adding a sequence number and time stamp to improve reliability.

Cache

In another aspect of the present invention, it is desired to further reduce network traffic over the Internet 20 when placing requested URLs into categories.

FIG. 8 shows that the client 12 preferably comprises a category cache 125. The category cache 125 stores URL categories by storing response data 620 from each categorisation request 500. Since users often navigate to a limited set of favourite web pages time and again, the category cache 125 significantly reduces traffic over the Internet 20 by avoiding duplication of requests for categorisation of the same URL or a child page from the same host or directory.

Figure 9:
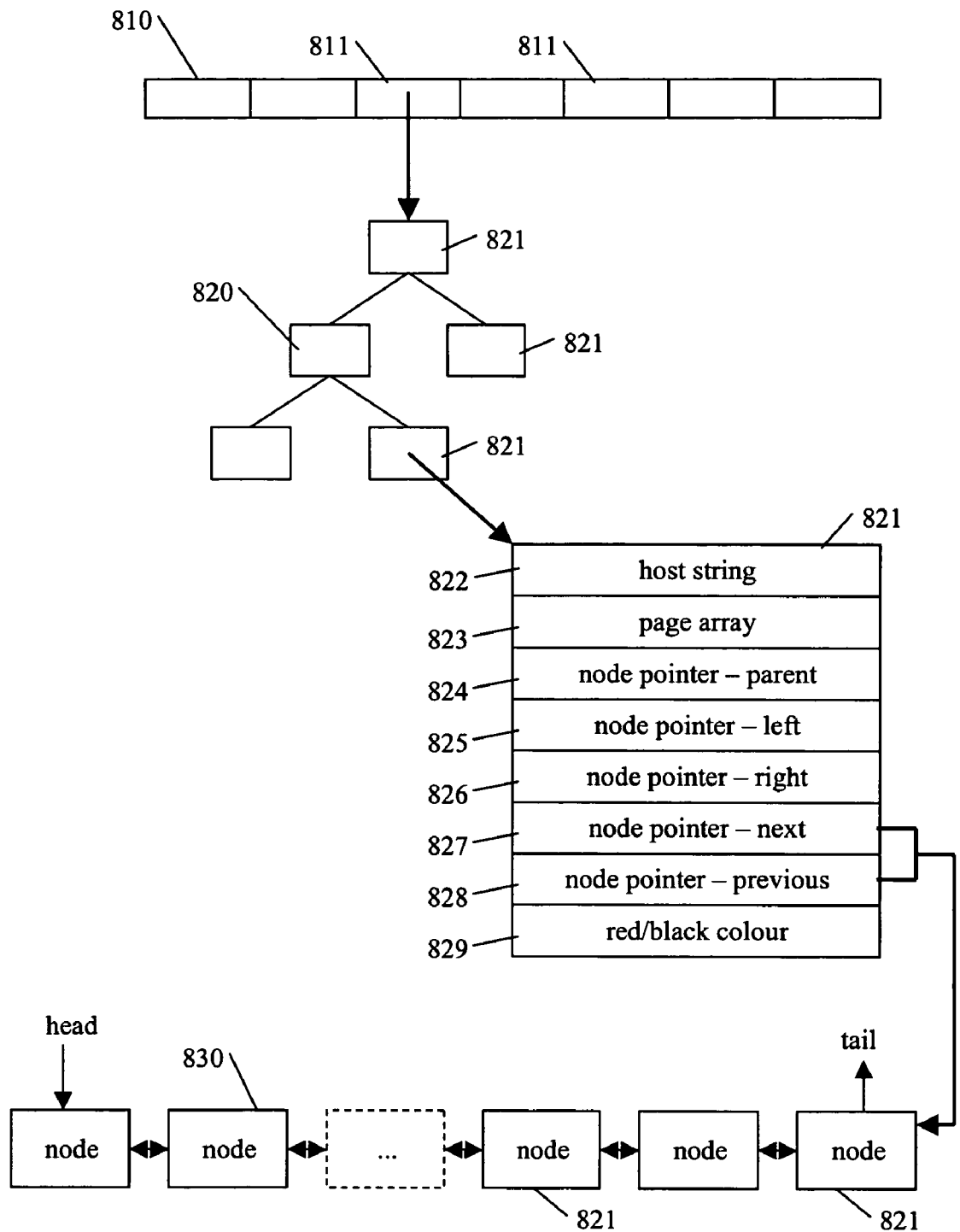
FIG. 9 is a logical representation of a preferred structure of a category cache.

FIG. 9 is a logical representation showing a preferred structure of the category cache 125. The cache is structured for both lookups of stored URLs, and also for aging of the cache to ensure that the cache remains within a predetermined maximum memory size. These two functions, namely lookup and aging, are combined so that both share the same nodes in the cache structure, which reduces cache size requirements. As will be discussed in more detail below, the cache 125 is compact and so occupies only a relatively small footprint within the memory of the client 12, whilst still recording valuable data in a manner that is readily searchable and updateable.

Referring again to FIG. 5, the method of the present invention preferably includes the step 405 of adding the determined URL category to the category cache 125.

In FIG. 9, the cache structure comprises a hash array 810, and combined host trees and age list 820. The host portion 202 of each URL is hashed to produce an index 811 in the hash array 810. Many hosts may produce the same hash index 811, and each array element is a pointer to a root tree node of a host tree 820. Hosts with the same hash are searched through the host tree 820, which is preferably a balanced red-black tree where each node has a red/black bit to colour the node red or black. There are n internal nodes and the tree 820 has a height of at most $2 \log_2(n+1)$ so that no leaf is more than twice as far from the root as any other. This is just one example tree structure and many other tree structures are applicable in embodiments of the present invention.

Each node 821 comprises a host string 822 holding a host portion 202, and optionally an array of pages 823 for the specified host 822. Left and right pointers 825, 826 are used for searching the tree 820. Each node also includes next and previous pointers 827,828 which refer to a next (older) node and a previous (newer) node, respectively, for aging. Also, each node includes a parent node pointer 824 to allow for fast node deletions.

As also shown in FIG. 9, the next and previous node pointers 827,828 allow the nodes to be arranged in order by age. New nodes are added to the head of the age list, and old nodes are removed from the tail. When the cache is full and has reached a predetermined maximum size, the oldest node is removed to make room for a new URL to be added in a new host node. Conveniently, the age list is refreshed, in order to keep the most recently accessed nodes at the head of the age list.

In a preferred embodiment, the memory footprint of the category cache 125 is configured in bytes, in order to determine the maximum size occupied by the hash array 810 and tree list 820. The size may be configured in use through a control panel, or determined automatically according to needs of the client and thereby balance available resources amongst neighbouring functions.

The hash array 810 has a predetermined length, which is ideally a prime number for better hash distribution. The hash array length is suitably dynamically configurable, such as by being a variable which is input from a control panel during use. A longer hash array yields faster categorisations, but uses more memory. As examples, the hashing algorithm is suitably MD4 or MD5.

In use, a URL host portion 202 and a URL path 204 are extracted from a URL request 11 within HTTP or equivalent. The host portion 202 is hashed to determine an index 811 in the hash array 810, and the respective host tree 820 is searched to locate a node 821 matching the host portion 202. The URL path portion 204 is then searched against the page array 823.

Figure 10:
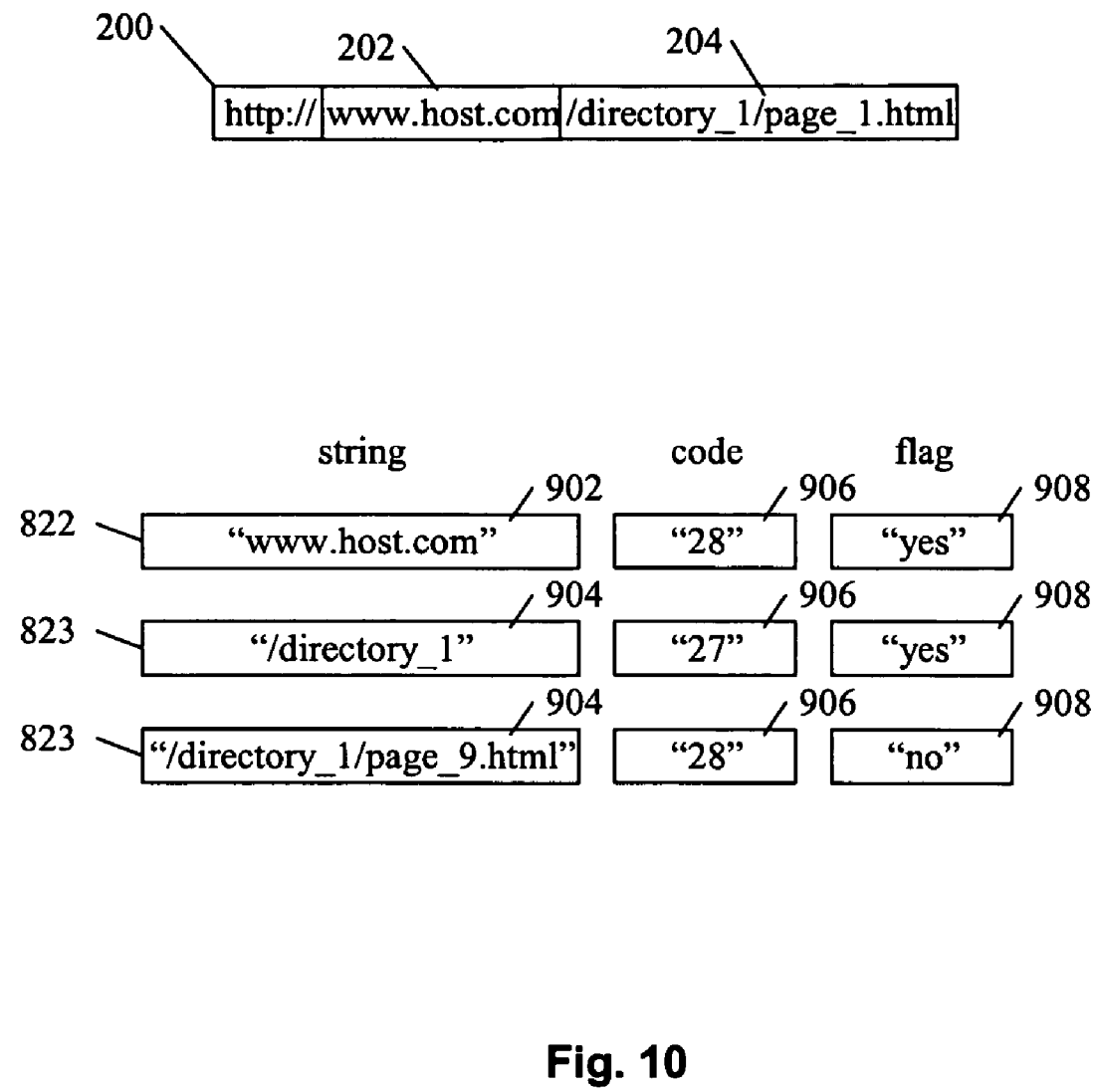
FIG. 10 shows example data held within the category cache of FIG. 9.

FIG. 10 shows example data held in the host string 822 and the page array 823. The host string 822 includes the host portion 902. In some embodiments, a category code 906 and a children flag 908 are provided for the host, or else these can be presented in a root page. The page array includes, for the or each page, a page string 904, a category code 906 for that page or directory, and a children flag 908.

In this example of FIG. 10, the host is "www.host.com" and a searched URL path is "/directory_1/page_1". The entry for the page string 904 "/directory_1" has a children flag 908 of "yes" which shows that specific category codes are available for children of this path. The cache shows that "/directory_1/page_9" has already been cached, but there is currently no entry for the searched page string "/directory_1/page_1". In this example, the cache 125 has failed to provide a category for the requested URL. A request message 500 is generated to determine the code for the specified URL, i.e. for host "www.host.com" and the path "/directory_1/page_1".

As a second example, assume that the children flag 908 for the page "/directory_1" is set to "no", which allows a cache result to be returned with confidence for the searched page based on a partial match. For example, if the children flag for "/directory_1" is set to "no", then a confident category code is returned for the requested "/directory_1/page_1" based on a partial match with "/directory_1" as a parent of the requested child page.

The cache 125 is suitably built by storing data from request messages 500 and reply messages 600. The request message 500 identifies the specified URL with the host portion 202 and the page portion 204 conveniently provided as a delimited character string. The host portion 202 forms the host string 902. The exact flag 623 determines the children flag 908. The match length field 622 determines a truncation point for the specified URL as a number of characters. The truncated URL is then added to the category cache. For example, the specified URL "www.host.com/directory_1/page_1/sub_page3" is truncated with an exact match at 19 characters to be stored as host="www.host.com" and page string="/directory_1/page_1". The category code field 621 provides the category code 906.

Referring again to FIG. 8, the gateway appliance 12 preferably further includes a custom cache 126 alongside the category cache 125. The custom cache 126 records a customised list of categorisations. In preferred embodiments, the custom cache 126 is used to override other categorisations, or to add supplementary URLs. In the preferred embodiment, the custom cache 126 is structured identical to the category cache 125. Searches are preferably conducted in order through the custom cache 126, then if necessary the category cache 125, and finally if necessary by generating a request message 500 to the categorisation server 40. Preferably, the custom cache 126 does not perform any URL aging, so that a user has full control over the size and content of the custom cache 126. In this case, the previous and next pointers 827, 828 are not required or are left unused.

In the preferred embodiment, the category cache 125 and/or the custom cache 126 can be cleared completely and then rebuilt with fresh data, such as after a reset operation. Preferably, each cache 125,126 may also be given a partial clear out, such as deleting all hosts 822 or pages 823 with a specified category code. The cache structure described with reference to FIGS. 8 and 9 enables convenient cache management, whilst being efficient to operate.

Figure 11:
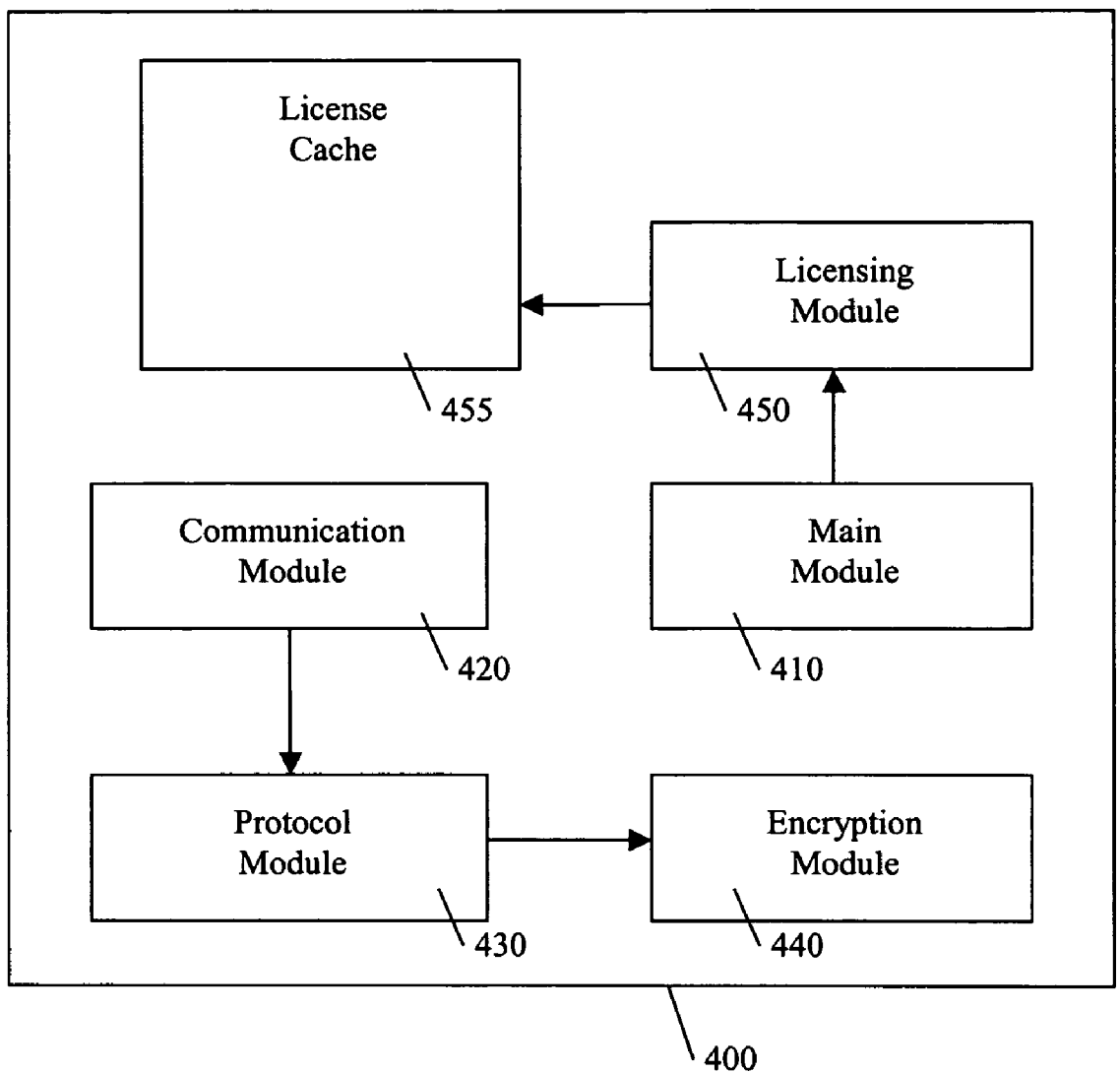
FIG. 11 is a schematic overview of a preferred categorisation server apparatus.

FIG. 11 is a schematic view of the categorisation server 40 including a main module 410, a communication module 420, a protocol module 430 and an encryption module 440. The main module 410 initialises the categorisation service and creates worker threads. The communication module 420 receives and buffers data and responds to categorisation requests including generation of reply messages 600. The protocol module 430 unmarshals incoming data into a comprehensible command format and marshals outgoing data into a transmittable format, and makes encryption/decryption calls to the encryption unit 440 where required. The encryption unit 440 encrypts and decrypts data, preferably according to the RC2 algorithm.

Licensing

In a further aspect of the present invention, the categorisation service 400 running on the categorisation server 40 performs a licensing process.

In particular, it is desired to confirm that the request message 500 is valid and comes from a valid client device 10,12. This licensing process controls access to the categorisation service, such as for security and to enable paid-for subscription based implementations.

The licensing process employed in the preferred embodiments of the present invention is highly flexible and is readily integrated with other existing licensing mechanisms.

As shown above in FIG. 6, the header 510 of each request message 500 preferably includes a licensing field 515 which carries data such as a licence key.

In the preferred embodiment, the licensing field 515 is subdivided into a partner ID field 516 and a client ID field 517. The partner ID field 516 allows a plurality of different licensing schemes to exist in parallel, each having different requirements or validation processes.

Referring again to FIG. 11, the categorisation service 400 comprises a licensing module 450 associated with the main module 410, which performs validation of the supplied licensing field 515. In the preferred embodiment, the licensing module 450 receives the licensing field 515 and returns a "licence valid" or "licence invalid" status which controls whether or not the categorisation server 40 will respond to a categorisation request message 500. Suitably, the licensing module 450 runs as a dynamically linked library (DLL).

In a further preferred embodiment, the categorisation service 400 includes a plurality of licensing DLLs 450, one of which is called to validate the licensing field 515 according to the partner ID field 516. This allows different licensing schemes to be applied for different clients.

In the preferred embodiment, the partner ID field 516 is 4 bytes long, giving up to 65535 licensing partner identities. The client ID field 517 is suitably up to 60 printable characters long, allowing room for any appropriate secure licensing mechanism.

It is important to validate licenses relatively quickly, since the system is operating in real time and a user is waiting for their requested web page. As show in FIG. 11, the categorisation server 40 preferably comprises a license cache 455 to store recently encountered license fields 515. The licensing process comprises first checking whether the received licensing field 515 is stored in the licensing cache 455, and then calling the licensing validation DLL 450. Suitably, the result of each licensing call is then added to the licensing cache 455 and is then available for subsequent requests from that client 12. Since clients tend to access the Internet in short burst of activity, it is likely that one categorisation request 500 will be followed by another soon after. The license cache 455 significantly improves response speed for second and subsequent requests.

Figure 12:
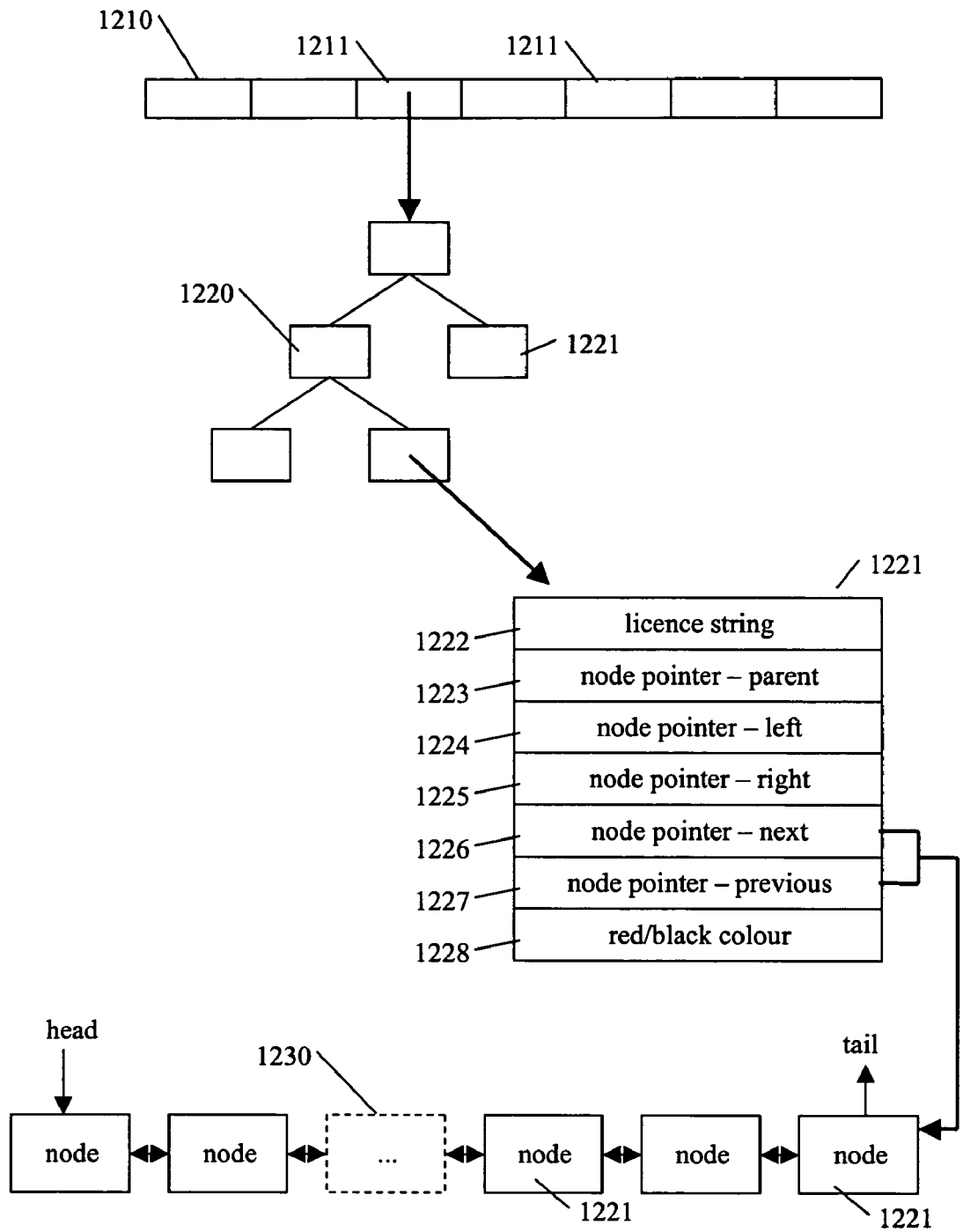
FIG. 12 is a schematic overview of a preferred licensing cache structure.

FIG. 12 is a schematic overview of the structure of the licensing cache 455. The structure is similar to that of the category cache 125 as discussed above with reference to FIG. 9.

As shown in FIG. 12, the licensing cache 455 comprises a hash array 1210 and one or more combined license trees and age list 1220. The hash array 1210 comprises index elements 1211 as a hash of license keys from the licensing field 515, each of which is a pointer to a licence tree list 1220.

Each tree node 1221 comprises a license string 1222 holding a license key and a corresponding license result (e.g. valid or invalid). The cache can hold solely valid keys, solely invalid keys, or, as in this example, a mixture of both, according to the circumstances of a particular implementation.

Further, each tree node 1221 comprises parent, left and right pointers 1223,1224,1225 defining the tree structure. This example shows a balanced red/black tree using a red/black flag 1228.

The license trees 1220 also functions as an age list to list each of the tree nodes 1221 by age. The age list comprises, within each tree node 1221, a next pointer 1226 and a previous pointer 1227 which refer to a next older tree node and a previous newer tree node, respectively.

Ideally, the license cache 455 is actively managed to reside within a predetermined memory size. Older tree nodes 1221 are deleted from a tail of the age list by referring to the next and previous pointers 1226,1227, whilst new nodes are added to the head of the age list. Optionally, the age list is updated after each access to keep recently accessed nodes at the head of the list.

In order to maintain valid content, the license cache is preferably flushed, in whole or in part, such as at scheduled regular timed intervals or following triggering events such as a reset.

Figure 13:
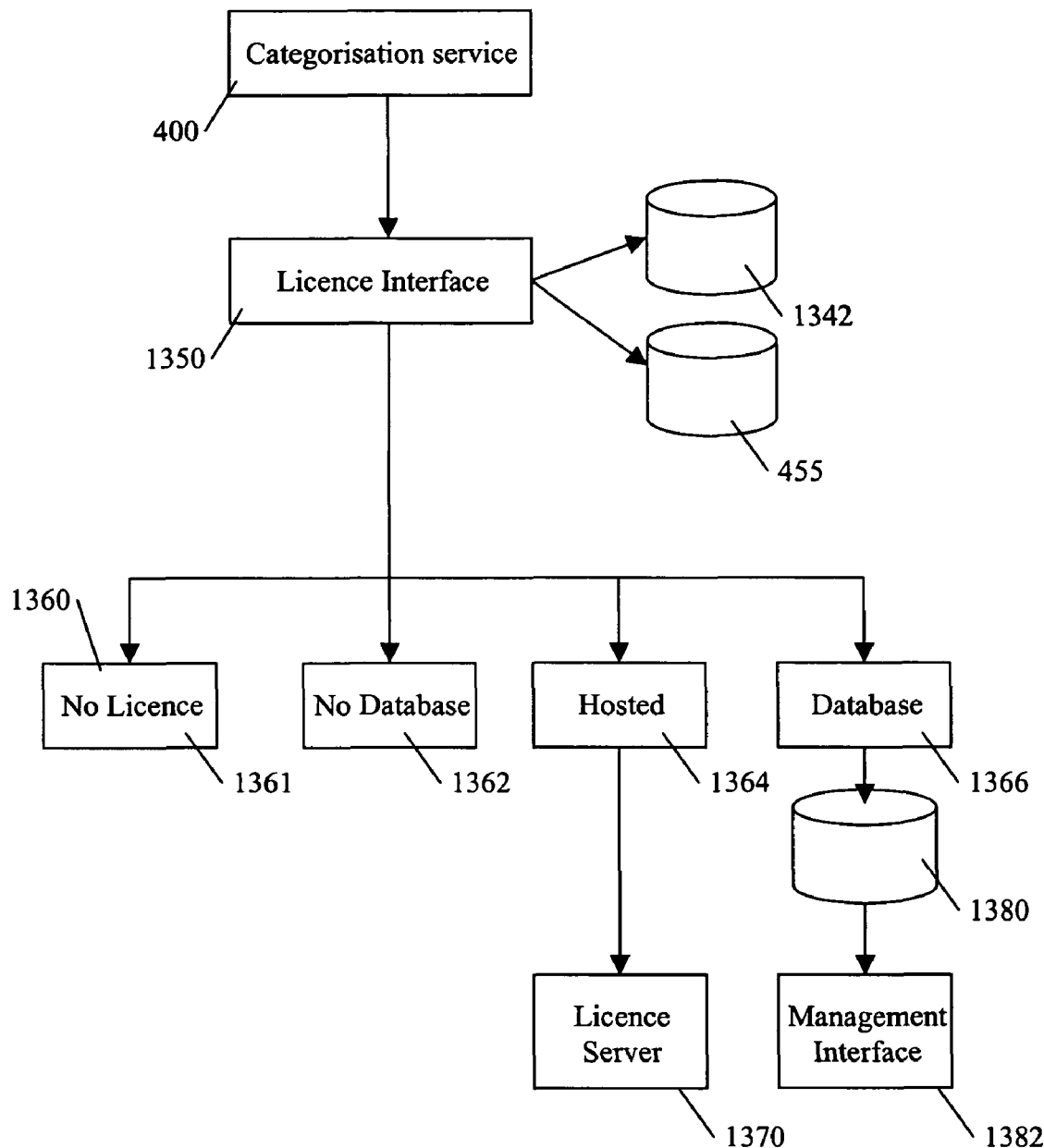
FIG. 13 is a schematic overview of preferred licensing systems.

FIG. 13 shows example licensing schemes in more detail.

The categorisation service 400 makes calls to a license interface DLL 1350, which in turn makes calls one of a plurality of partner licence DLLs 1360.

The license interface DLL 1350 optionally includes the license cache 455. Preferably, the licence interface DLL first consults the licence cache 455 and then, if necessary, request licence validation by one of the partner licence DLLs 1360.

In this preferred embodiment, the license interface DLL 1350 resolves the partner ID field 516 by referring to a partner map database 1352, which links the partner ID 516 to a partner DLL name and preferably provides configuration information for making calls into that DLL.

In FIG. 12, the partner licence DLLs 1360 include a no license DLL 1361 which simply indicates that any licence key is valid. This allows the system to run a default "no problem" licence mode prior to implementation of licence schemes which actively validate licence keys.

As one option, a no database DLL 1362 performs a mathematical, algorithmic or cryptographic validation of the licence key.

As another option, a hosted licensing DLL 1364 is provided which forwards licensing requests to a remote licensing server 1370 for validation. As examples, the licensing requests are sent over a local area network (LAN), or are forwarded using a SOAP-based web service over the Internet 20.

As yet another option, a database licensing DLL 1366 connects directly into an ODBC database 1380 using a stored procedure to validate the licence key. The database 1380 suitably stores the partner ID field 516, licence code 517, and expiry date of valid licenses and hence can offer validation for a plurality of partner licence schemes. A licence management interface 1382 is provided to manage the content of the licence database 1380.

This aspect of the present invention has many advantages, as discussed above. Licensing is very useful in the context of controlling or monitoring Internet access by categorisation of URLs, and opens up many useful commercial and technical implementations of this technology. Further, the use of a licensing cache reduces time and resources for each validation and increases throughput. The cache is structured to be compact and is easily managed. The use of a partner ID field allows great flexibility and convenience to choose between available licensing schemes.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method for use in controlling or monitoring of Internet access by categorizing Uniform Resource Locators (URLs), comprising the steps of:
   receiving a request message from a client device requesting categorization of a specified URL, wherein the request message comprises at least four different members of the group comprising a time stamp, a sequence number, a data size, a request data, data indicative of the specified URL including a host portion, and a licensing field carrying a license key having a partner ID and a client ID;
   validating by a processor of a categorization server using Dynamic Link Library, the license key using the partner ID to identify a licensing scheme from one of a plurality of selectable licensing schemes and using the client ID to validate the client device; and
   if valid, generating a reply message denoting a category of the specified URL amongst a predetermined set of categories, wherein the reply message comprises at least one of a date or time stamp;.
   wherein the categorization of the URL is initially based on information indicative of a host name.

2. The method of claim 1, further comprising:
   receiving the request message generated at a client device; and
   validating the license key at a categorization server.

3. The method of claim 2, wherein the license key is associated with the client device.

4. The method of claim 3, further comprising calling a license module, said calling includes passing the licensing key to the license module for validation.

5. The method of claim 4, further comprising the steps of:
   storing one or more license keys in a license cache, where the stored license keys have been validated previously; and
   validating a received license key by matching it with a stored license key in the license cache, or else calling the license module.

6. The method of claim 5, further comprising the step of adding a validated license key to the license cache, when validity of the license key has been determined by the license module.

7. The method of claim 5, wherein the license cache comprises:
   a hash array comprising one or more index elements, each index element comprising a license tree pointer and a hash key derived from a stored license key; and
   one or more license trees comprising one or more tree nodes each holding license data representing stored license keys and an associated validity status.

8. The method of claim 7, wherein the licensing cache further comprises:
   an age list including the one or more tree nodes organized by age, wherein the age list comprises, within each tree node, a next pointer and a previous pointer which refer to a next older tree node and a previous newer tree node, respectively.

9. The method of claim 8, comprising managing the license cache to stay within a predetermined size by deleting older tree nodes from a tail of the age list, and adding new tree nodes to the head of the age list, wherein deleting comprises referring a tree node to the next and previous tree pointers.

10. The method of claim 9, comprising updating the age list to keep recently accessed tree nodes at the head of the age list.

11. The method of claim 10, comprising periodically flushing the license cache.

12. The method of claim 5, wherein the license module is a dynamic linked library (DLL).

13. The method of claim 2, wherein the client device and the categorization server communicate over the Internet, and wherein the method comprises transmitting the request message over the Internet and transmitting the reply message over the Internet.

14. The method of claim 13, wherein the client device comprises a user machine to provide a human-oriented user interface, and a client internet gateway appliance to couple the user machine to the Internet through an Internet Service Provider (ISP), and wherein the method comprises:
  initiating a URL request in the user machine to request a web page from the specified URL; and
  servicing the URL request at the client internet gateway appliance, including requesting the web page from a host according to the specified URL.

15. The method of claim 14, wherein the user machine and the client internet gateway appliance are formed within a single integrated device.

16. The method of claim 14, wherein the user machine and the client internet gateway appliance are separate devices arranged to communicate over a local network.

17. The method of claim 2, wherein the client device and the categorization sever are arranged to communicate over a local area network.

18. The method of claim 1, further comprising selecting a partner license module from amongst one or more partner license modules according to the partner ID field, and passing the licensing key to the selected partner license module for validation.

19. A non-transitory program storage medium having computer executable instructions stored thereon for performing the method of claim 1.

20. A method for use at a categorization server in controlling or monitoring of Internet access at a client device, the method comprising the steps of:
  receiving a request message to request categorization of a specified URL, wherein the request message comprises at least four different members of the group comprising a time stamp, a sequence number, a data size, a request data, data indicative of the specified URL including a host portion, and a licensing field carrying a license key having a partner ID and a client ID; and
  validating by a processor of the categorization server using Dynamic Link Library, the license key using the partner ID to identify a licensing scheme from one of a plurality of selectable licensing schemes and using the client ID to validate the client device, wherein the reply message comprises at least one of a date or time stamp; and
  if valid, generating a reply message denoting a category of the specified URL amongst a predetermined set of categories,
  wherein the categorization of the URL is initially based on information indicative of a host name.

21. The method of claim 20, further comprising:
  storing one or more license keys in a license cache, where the stored license keys have been validated previously; and
  validating a received license key by matching with a stored license key in the license cache, or else calling a license validation function.

22. The method of claim 20, further comprising:
  passing the license key to a licensing module which performs validation and returns a "license valid" or "license invalid" status; and
  controlling whether or not the categorization server will respond to the request message based on the status.

23. A non-transitory program storage medium having computer executable instructions stored thereon for performing the method of claim 20.

24. A categorization server, comprising:
  a first module arranged to receive a request message denoting a specified URL and to provide a corresponding category code in return, wherein the request message further comprises at least four different members of the group comprising a time stamp, a sequence number, a data size, a request data, data indicative of the specified URL including a host portion, and a license key having a partner ID and a client ID; and
  a license module, executed on a processor of the categorization server using Dynamic Link Library, said license module arranged to validate the license key using the partner ID to identify a licensing scheme from one of a plurality of selectable licensing schemes and using the client ID to validate a client device and thereby control whether or not the first module provides the category code,
  wherein the categorization of the URL is initially based on information indicative of a host name.

25. The categorization server of claim 24, wherein the license module comprises a license cache to store one or more license keys which have been validated recently.

26. The categorization server of claim 24, wherein the license module comprises:
  a partner license module arranged to validate a license key and provide a validation result; and
  a license interface module arranged to pass the license key to the partner license module and receive the validation result.

27. The categorization server of claim 24, wherein the license module comprises:
  one or more partner license DLLs each arranged to validate the license key and provide a validation result; and
  a license interface DLL arranged to pass the license key to a selected one amongst the one or more partner licenses DLLs according to a partner ID field and receive the validation result.

28. The categorization server of claim 27, wherein the license interface DLL resolves a partner ID field by referring to a partner map database, which links the partner ID to a partner license DLL name.

29. The categorization server of claim 28, wherein the one or more partner license DLLs include any one or more of:
  a no license DLL which indicates that any license key is valid;
  a no database DLL which performs a mathematical, algorithmic or cryptographic validation of the license key;
  a hosted licensing DLL which forwards licensing requests to a remote licensing server for validation; and
  a database licensing DLL which connects directly into an ODBC database using a stored procedure to validate the license key.

30. The categorization server of claim 24, comprising:
  a main module arranged to determine a category of a specified URL amongst a set of predetermined categories by comparing the specified URL against stored URLs in a categorization database;

an encryption unit arranged to encrypt and decrypt data;
a protocol module arranged to unmarshal incoming data into a comprehensible command format and marshal outgoing data into a transmittable format, and make encryption and decryption calls to the encryption unit; and
a communication module arranged to receive and buffer incoming and outgoing data and respond to an incoming categorization request message including generation of a corresponding outgoing reply message;
wherein the licensing module is arranged to validate a license key provided in the incoming categorization request message and inform the communication module of a validation result.

* * * * *